United States Patent

Gutman et al.

(10) Patent No.: US 11,979,181 B2
(45) Date of Patent: May 7, 2024

(54) TECHNIQUES FOR SIGNALING TRANSMITTER NOISE SPURS

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/584,108

(22) Filed: Jan. 25, 2022

(65) Prior Publication Data

US 2023/0238992 A1 Jul. 27, 2023

(51) Int. Cl.
*H04B 1/12* (2006.01)
*H04B 1/10* (2006.01)
*H04B 1/14* (2006.01)
*H04L 5/00* (2006.01)
*H04W 72/541* (2023.01)

(52) U.S. Cl.
CPC ............ *H04B 1/12* (2013.01); *H04B 1/1036* (2013.01); *H04B 1/14* (2013.01); *H04L 5/0048* (2013.01); *H04W 72/541* (2023.01)

(58) Field of Classification Search
CPC .. H04B 1/1036; H04B 1/1045; H04B 1/1054; H04B 1/1063; H04B 1/1072; H04B 1/109; H04B 1/12; H04B 1/14; H04L 5/0048; H04W 72/541
See application file for complete search history.

(56) References Cited

U.S. PATENT DOCUMENTS

| | | | | |
|---|---|---|---|---|
| 8,451,918 | B1 * | 5/2013 | Cheng | H04K 3/228 370/208 |
| 10,873,333 | B2 * | 12/2020 | Avivi | H03L 7/093 |
| 2011/0158211 | A1 * | 6/2011 | Gaal | H04L 27/2647 375/260 |
| 2023/0239181 | A1 * | 7/2023 | Sverdlov | H04L 5/0048 375/262 |

* cited by examiner

*Primary Examiner* — Siu M Lee
(74) *Attorney, Agent, or Firm* — Holland & Hart LLP

(57) ABSTRACT

Methods, systems, and devices for wireless communications are described. A transmitting (Tx) device transmits, to a receiving (Rx) device, a control message indicating a location of one or more noise spurs associated with wireless communications performed by the Tx device using a set of resources, where the location includes a frequency location of the one or more noise spurs in the frequency domain. The Tx device then generates a data message to be communicated using the set of resources associated with the one or more noise spurs based on transmitting the control message, and transmits the generated data message to the Rx device using the set of resources associated with the one or more noise spurs. By indicating the location of the noise spurs, the Rx device may be more able to more efficiently identify and address (e.g., filter out, ignore) the noise spurs within the data message.

30 Claims, 15 Drawing Sheets

TECHNIQUES FOR SIGNALING TRANSMITTER NOISE SPURS

FIELD OF TECHNOLOGY

The following relates to wireless communications, including techniques for signaling transmitter noise spurs.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, wireless signaling may experience "noise spurs" in the frequency domain. Noise spurs are narrowband distortions resulting from intermodulation between different oscillator signals of a radio frequency that result in excessive channel noise at a specific tone in the frequency domain. For example, Wi-Fi and 5G communications at a UE may result in noise "spikes," or spurs, at specific frequencies or tones. Conventional techniques for mitigating noise spurs can be improved.

SUMMARY

The described techniques relate to improved methods, systems, devices, and apparatuses that support techniques for signaling transmitter noise spurs. Generally, the described techniques provide for signaling which enables transmitting (Tx) devices to inform receiving (Rx) devices of the locations of spurs within signals that are to be transmitted by the Tx device. Techniques described herein enable Tx devices to tell Rx devices where the Rx devices are expected to experience spurs, which may enable the Rx devices to more accurately and efficiently reduce the parasitic effects on the receiving end. For example, a Tx device transmits a control message to an Rx device, where the control message indicates locations (in the frequency domain) of spurs within a given span of resources (e.g., within a component carrier). The Tx device may be preconfigured with information regarding spurs generated by the Tx device based on calibration procedures performed during the fabrication of the Tx device. Subsequently, the Tx device generates a data message within the span of resources (e.g., within the component carrier), and transmits the data message to the Rx device. Using knowledge of the frequency location of the spurs, the Rx device may be more able to address (e.g., mitigate, ignore) the spurs within the received data message.

A method for wireless communication at a first wireless device is described. The method may include transmitting, to a second wireless device, a control message indicating a location of one or more noise spurs associated with wireless communications performed by the first wireless device using a set of resources, where the location includes a frequency location of the one or more noise spurs in a frequency domain of the set of resources, generating a data message to be communicated from the first wireless device to the second wireless device using the set of resources associated with the one or more noise spurs based on transmitting the control message, and transmitting the generated data message to the second wireless device using the set of resources associated with the one or more noise spurs.

An apparatus for wireless communication at a first wireless device is described. The apparatus may include a processor, memory coupled with the processor, and instructions stored in the memory. The instructions may be executable by the processor to cause the apparatus to transmit, to a second wireless device, a control message indicating a location of one or more noise spurs associated with wireless communications performed by the first wireless device using a set of resources, where the location includes a frequency location of the one or more noise spurs in a frequency domain of the set of resources, generate a data message to be communicated from the first wireless device to the second wireless device using the set of resources associated with the one or more noise spurs based on transmitting the control message, and transmit the generated data message to the second wireless device using the set of resources associated with the one or more noise spurs.

Another apparatus for wireless communication at a first wireless device is described. The apparatus may include means for transmitting, to a second wireless device, a control message indicating a location of one or more noise spurs associated with wireless communications performed by the first wireless device using a set of resources, where the location includes a frequency location of the one or more noise spurs in a frequency domain of the set of resources, means for generating a data message to be communicated from the first wireless device to the second wireless device using the set of resources associated with the one or more noise spurs based on transmitting the control message, and means for transmitting the generated data message to the second wireless device using the set of resources associated with the one or more noise spurs.

A non-transitory computer-readable medium storing code for wireless communication at a first wireless device is described. The code may include instructions executable by a processor to transmit, to a second wireless device, a control message indicating a location of one or more noise spurs associated with wireless communications performed by the first wireless device using a set of resources, where the location includes a frequency location of the one or more noise spurs in a frequency domain of the set of resources, generate a data message to be communicated from the first wireless device to the second wireless device using the set of resources associated with the one or more noise spurs based on transmitting the control message, and transmit the generated data message to the second wireless device using the set of resources associated with the one or more noise spurs.

Some examples of the method, apparatuses, and non-transitory computer-readable medium described herein may further include operations, features, means, or instructions for transmitting, via the control message, an indication of a spur location configuration associated with a first beam, the spur location configuration including the location of the one or more noise spurs associated with wireless communications performed by the first wireless device using the first beam and the set of resources, where the data message may be transmitted via the first beam.

Some examples of the method, apparatuses, and non-transitory computer-readable medium described herein may further include operations, features, means, or instructions for transmitting, via the control message, a second control message, or both, an indication of a second beam associated with the spur location configuration, the spur location configuration including the location of the one or more noise spurs associated with wireless communications performed by the first wireless device using the second beam and the set of resources and transmitting a second data message to the second wireless device using the second beam and the set of resources in response to transmitting the control message, the second control message, or both.

Some examples of the method, apparatuses, and non-transitory computer-readable medium described herein may further include operations, features, means, or instructions for transmitting, via the control message, a second control message, or both, an indication of a second spur location configuration associated with a second beam, the second spur location configuration including a second location of one or more additional noise spurs associated with wireless communications performed by the first wireless device using the second beam and the set of resources and transmitting a second data message to the second wireless device using the second beam and the set of resources in response to transmitting the control message, the second control message, or both.

In some examples of the method, apparatuses, and non-transitory computer-readable medium described herein, the indication of the spur location configuration includes a quasi co-location (QCL) type indicator associated with noise spurs.

Some examples of the method, apparatuses, and non-transitory computer-readable medium described herein may further include operations, features, means, or instructions for receiving, from the second wireless device and based on transmitting the control message, a second control message indicating one or more noise spur mitigation procedures performable by the second wireless device, where generating the data message, transmitting the data message, or both, may be based on the one or more noise spur mitigation procedures.

In some examples of the method, apparatuses, and non-transitory computer-readable medium described herein, generating the data message may include operations, features, means, or instructions for generating the data message, based on the one or more noise spur mitigation procedures, such that a pilot signal associated with the data message, data within the data message, or both, may be transmitted at a second frequency location in the frequency domain of the set of resources that may be different from the frequency location of the one or more noise spurs.

In some examples of the method, apparatuses, and non-transitory computer-readable medium described herein, the data message includes a portion of a communication transmitted by the first wireless device and the method, apparatuses, and non-transitory computer-readable medium may include further operations, features, means, or instructions for transmitting, based on the one or more noise spur mitigation procedures, an indication of a time interval between a start of the communication and a start of the data message within the communication, where generating the data message, transmitting the data message, or both, may be based on the time interval.

Some examples of the method, apparatuses, and non-transitory computer-readable medium described herein may further include operations, features, means, or instructions for transmitting a set of pilot signals including the one or more noise spurs within the time interval using the set of resources associated with the one or more noise spurs.

In some examples of the method, apparatuses, and non-transitory computer-readable medium described herein, the indication of the time interval includes an indication of a portion of a symbol length between the start of the communication and the start of the data message within the communication.

In some examples of the method, apparatuses, and non-transitory computer-readable medium described herein, the one or more noise spur mitigation procedures include an active mitigation procedure in which the second wireless device attempts to remove or filter noise spurs from received communications, a passive mitigation procedure in which the second wireless device ignores tones associated with noise spurs within received communications, or both, the active mitigation procedure including a time-domain (TD) mitigation procedure, a frequency-domain (FD) mitigation procedure, or both, and the passive mitigation procedure including a nulling procedure.

Some examples of the method, apparatuses, and non-transitory computer-readable medium described herein may further include operations, features, means, or instructions for identifying whether the one or more noise spur mitigation procedures performable by the second wireless device include an active mitigation procedure, a passive mitigation procedure, or both, where generating the data message, transmitting the data message, or both, may be based on the identifying.

In some examples of the method, apparatuses, and non-transitory computer-readable medium described herein, the noise spur mitigation procedure includes a TD mitigation procedure associated with a notch filter and the method, apparatuses, and non-transitory computer-readable medium may include further operations, features, means, or instructions for transmitting, to the second wireless device and in response to the noise spur mitigation procedure, an indication of one or more filtering coefficients associated with the notch filter.

Some examples of the method, apparatuses, and non-transitory computer-readable medium described herein may further include operations, features, means, or instructions for identifying a stability of the one or more noise spurs associated with the set of resources and determining the one or more filtering coefficients based on the stability.

In some examples of the method, apparatuses, and non-transitory computer-readable medium described herein, the data message includes a portion of a communication transmitted by the first wireless device and the method, apparatuses, and non-transitory computer-readable medium may include further operations, features, means, or instructions for receiving, from the second wireless device and based on transmitting the control message, a request for a time interval between a start of the communication and a start of the data message within the communication, where generating the data message, transmitting the data message, or both, may be based on the request, the time interval, or both.

In some examples of the method, apparatuses, and non-transitory computer-readable medium described herein, transmitting the data message may include operations, features, means, or instructions for transmitting one or more pilot signals including the one or more noise spurs within the communication for at least the time interval prior to transmitting the data message based on the request.

In some examples of the method, apparatuses, and non-transitory computer-readable medium described herein, the set of resources includes a first component carrier and the method, apparatuses, and non-transitory computer-readable medium may include further operations, features, means, or instructions for transmitting, via the control message, an additional control message, or both, an indication of a second location of one or more additional noise spurs associated with wireless communications performed by the first wireless device using a second component carrier, where the second location includes a second frequency location of the one or more additional noise spurs in a frequency domain of the second component carrier.

In some examples of the method, apparatuses, and non-transitory computer-readable medium described herein, the control message includes a radio resource control (RRC) message, a medium access control-control element (MAC-CE) message, or both.

In some examples of the method, apparatuses, and non-transitory computer-readable medium described herein, the location of the one or more noise spurs may be indicated via an indication of a percentage of a subcarrier spacing (SCS) and an anchor within the set of resources, an indication of one or more subcarrier indexes, or both.

In some examples of the method, apparatuses, and non-transitory computer-readable medium described herein, the first wireless device includes a user equipment (UE) and the second wireless device includes a base station and the first wireless device includes the base station and the second wireless device includes the UE.

A method for wireless communication at a second wireless device is described. The method may include receiving, from a first wireless device, a control message indicating a location of one or more noise spurs associated with wireless communications performed by the first wireless device using a set of resources, where the location includes a frequency location of the one or more noise spurs in a frequency domain of the set of resources, receiving, from the first wireless device and based on receiving the control message, a data message using the set of resources associated with the one or more noise spurs, and performing one or more noise spur mitigation procedures for the data message based on the location of the one or more noise spurs.

An apparatus for wireless communication at a second wireless device is described. The apparatus may include a processor, memory coupled with the processor, and instructions stored in the memory. The instructions may be executable by the processor to cause the apparatus to receive, from a first wireless device, a control message indicating a location of one or more noise spurs associated with wireless communications performed by the first wireless device using a set of resources, where the location includes a frequency location of the one or more noise spurs in a frequency domain of the set of resources, receive, from the first wireless device and based on receiving the control message, a data message using the set of resources associated with the one or more noise spurs, and perform one or more noise spur mitigation procedures for the data message based on the location of the one or more noise spurs.

Another apparatus for wireless communication at a second wireless device is described. The apparatus may include means for receiving, from a first wireless device, a control message indicating a location of one or more noise spurs associated with wireless communications performed by the first wireless device using a set of resources, where the location includes a frequency location of the one or more noise spurs in a frequency domain of the set of resources, means for receiving, from the first wireless device and based on receiving the control message, a data message using the set of resources associated with the one or more noise spurs, and means for performing one or more noise spur mitigation procedures for the data message based on the location of the one or more noise spurs.

A non-transitory computer-readable medium storing code for wireless communication at a second wireless device is described. The code may include instructions executable by a processor to receive, from a first wireless device, a control message indicating a location of one or more noise spurs associated with wireless communications performed by the first wireless device using a set of resources, where the location includes a frequency location of the one or more noise spurs in a frequency domain of the set of resources, receive, from the first wireless device and based on receiving the control message, a data message using the set of resources associated with the one or more noise spurs, and perform one or more noise spur mitigation procedures for the data message based on the location of the one or more noise spurs.

Some examples of the method, apparatuses, and non-transitory computer-readable medium described herein may further include operations, features, means, or instructions for receiving, via the control message, an indication of a spur location configuration associated with a first beam, the spur location configuration including the location of the one or more noise spurs associated with wireless communications performed by the first wireless device using the first beam and the set of resources, where the data message may be received via the first beam.

Some examples of the method, apparatuses, and non-transitory computer-readable medium described herein may further include operations, features, means, or instructions for receiving, via the control message, a second control message, or both, an indication of a second beam associated with the spur location configuration, the spur location configuration including the location of the one or more noise spurs associated with wireless communications performed by the first wireless device using the second beam and the set of resources and receiving a second data message from the first wireless device using the second beam and the set of resources in response to receiving the control message, the second control message, or both.

Some examples of the method, apparatuses, and non-transitory computer-readable medium described herein may further include operations, features, means, or instructions for receiving, via the control message, a second control message, or both, an indication of a second spur location configuration associated with a second beam, the second spur location configuration including a second location of one or more additional noise spurs associated with wireless communications performed by the first wireless device using the second beam and the set of resources and receiving a second data message from the first wireless device using the second beam and the set of resources in response to receiving the control message, the second control message, or both.

In some examples of the method, apparatuses, and non-transitory computer-readable medium described herein, the indication of the spur location configuration includes a QCL type indicator associated with noise spurs.

Some examples of the method, apparatuses, and non-transitory computer-readable medium described herein may further include operations, features, means, or instructions for transmitting, to the first wireless device and based on receiving the control message, a second control message indicating the one or more noise spur mitigation procedures performable by the second wireless device, where receiving the data message may be based on the one or more noise spur mitigation procedures.

In some examples of the method, apparatuses, and non-transitory computer-readable medium described herein, the data message includes a portion of a communication transmitted by the first wireless device and the method, apparatuses, and non-transitory computer-readable medium may include further operations, features, means, or instructions for receiving, based on the indication of the one or more noise spur mitigation procedures, an indication of a time interval between a start of the communication and a start of the data message within the communication, where receiving the data message may be based on the time interval.

Some examples of the method, apparatuses, and non-transitory computer-readable medium described herein may further include operations, features, means, or instructions for receiving a set of pilot signals including the one or more noise spurs within the time interval using the set of resources associated with the one or more noise spurs and estimating the one or more noise spurs based on receiving the set of pilot signals, where performing the one or more noise spur mitigation procedures may be based on estimating the one or more noise spurs.

In some examples of the method, apparatuses, and non-transitory computer-readable medium described herein, the one or more noise spur mitigation procedures include an active mitigation procedure in which the second wireless device attempts to remove or filter noise spurs from received communications, a passive mitigation procedure in which the second wireless device ignores tones associated with noise spurs within received communications, or both, the active mitigation procedure including a TD mitigation procedure, an FD mitigation procedure, or both, and the passive mitigation procedure including a nulling procedure.

In some examples of the method, apparatuses, and non-transitory computer-readable medium described herein, the one or more noise spur mitigation procedures include a TD mitigation procedure associated with a notch filter and the method, apparatuses, and non-transitory computer-readable medium may include further operations, features, means, or instructions for receiving, from the first wireless device and in response to the indication of the one or more noise spur mitigation procedures, an indication of one or more filtering coefficients associated with the notch filter, where the one or more noise spur mitigation procedures may be performed in accordance with the one or more filtering coefficients.

In some examples of the method, apparatuses, and non-transitory computer-readable medium described herein, the data message includes a portion of a communication transmitted by the first wireless device and the method, apparatuses, and non-transitory computer-readable medium may include further operations, features, means, or instructions for transmitting, to the first wireless device and based on receiving the control message, a request for a time interval between a start of the communication and a start of the data message within the communication, where receiving the data message may be based on the request, the time interval, or both.

Some examples of the method, apparatuses, and non-transitory computer-readable medium described herein may further include operations, features, means, or instructions for receiving one or more pilot signals including the one or more noise spurs within the communication for at least the time interval and estimating the one or more noise spurs based on receiving the one or more pilot signals, where the one or more noise spur mitigation procedures may be performed based on estimating the one or more noise spurs.

In some examples of the method, apparatuses, and non-transitory computer-readable medium described herein, the set of resources includes a first component carrier and the method, apparatuses, and non-transitory computer-readable medium may include further operations, features, means, or instructions for receiving, via the control message, an additional control message, or both, an indication of a second location of one or more additional noise spurs associated with wireless communications performed by the first wireless device using a second component carrier, where the second location includes a second frequency location of the one or more additional noise spurs in a frequency domain of the second component carrier.

In some examples of the method, apparatuses, and non-transitory computer-readable medium described herein, the first wireless device includes a UE and the second wireless device includes a base station and the first wireless device includes the base station and the second wireless device includes the UE.

Some examples of the method, apparatuses, and non-transitory computer-readable medium described herein may further include operations, features, means, or instructions for transmitting, to a third wireless device and based on receiving the control message, a second control message indicating the location of the one or more noise spurs.

DETAILED DESCRIPTION

Figure 1:
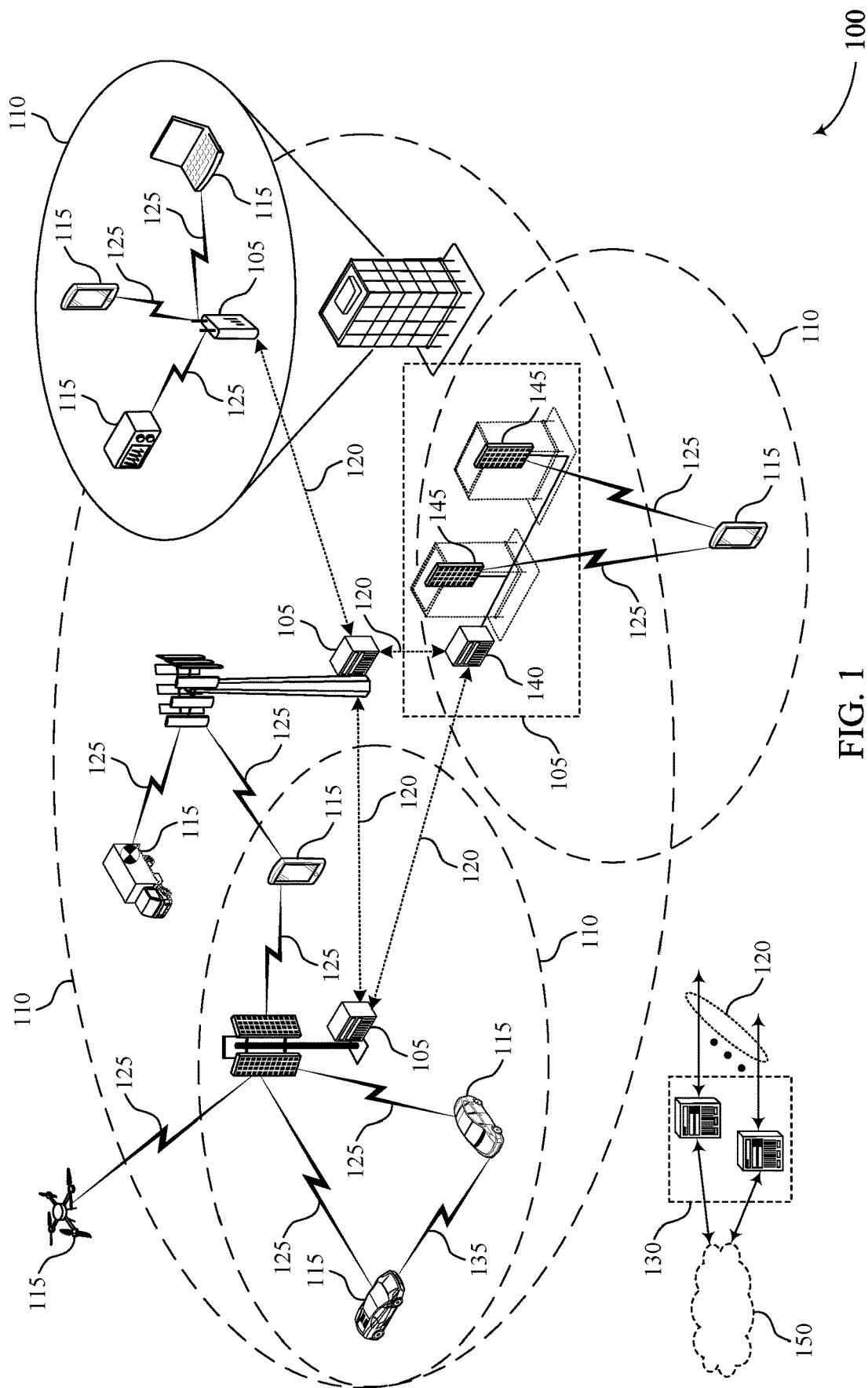
FIG. 1 illustrates an example of a wireless communications system that supports techniques for signaling transmitter noise spurs in accordance with aspects of the present disclosure.

In some cases, wireless signaling may experience "noise spurs" in the frequency domain. Noise spurs are very narrowband distortions resulting from intermodulation between different oscillator signals of a radio frequency that result in excessive channel noise at a specific tone in the frequency domain. For example, Wi-Fi and 5G communications at a UE may result in noise "spikes," or spurs, at specific frequencies or tones. There are different techniques for addressing and minimizing noise spurs at a receiving (Rx) device, including active noise spur mitigation techniques (e.g., time domain (TD) techniques, frequency domain (FD) techniques) and passive noise spur mitigation techniques (e.g., nulling techniques). For example, using TD spur mitigation techniques, an Rx device may be able to estimate and identify spurs within received signals, and apply a "notch filter" to reduce an impact of the spur on the underlying signal. However, spur mitigation techniques performed at an Rx device may be complex and computationally expensive. Additionally, Rx-based spur mitigation techniques may be unable to completely eliminate spurs from a signal. Further, mitigating/eliminating spurs on the transmitting (Tx) side requires more complex transmitters with spatial isolation, which is extremely costly and difficult to perform with smaller wavelength communications such as Fifth Generation (5G) communications.

Accordingly, aspects of the present disclosure supports signaling and other configurations which enable Tx devices to inform Rx devices of the locations of spurs within signals that are to be transmitted by the Tx device. Techniques described herein enable Tx devices to tell Rx devices where the Rx devices are expected to experience spurs, which may enable the Rx devices to more accurately and efficiently reduce the parasitic effects on the receiving end. For example, a Tx device may transmit a control message to an Rx device, where the control message indicates locations (in the frequency domain) of spurs within a given span of resources (e.g., within a component carrier). The Tx device may be pre-configured with information regarding spurs generated by the Tx device based on calibration procedures performed during the fabrication of the Tx device. Subsequently, the Tx device may generate a data message within the span of resources (e.g., within the component carrier), and transmit the data message to the Rx device. Using knowledge of the frequency location of the spurs, the Rx device may be more able to address (e.g., mitigate, ignore) the spurs within the received data message.

In some cases, the Rx device may indicate, to the Tx device, which (if any) spur mitigation techniques the Rx device can/will implement. The Tx device may adjust how a message is transmitted (e.g., over which resources) based on the mitigation technique that will be implemented by the Rx device. For example, depending on the type of spur mitigation technique that will be performed by the Rx device, the Tx device may generate the data message such that data and/or pilots of the data are not transmitted at the locations of the noise spurs. Further, the Tx device may indicate (or the Rx device may request) a period of time before the transmitted data message in which the Tx device will transmit nulls or pilot signals (which will include spurs) that will enable the Rx device to more efficiently measure the noise spurs during the period of time, and use the measurements to address noise spurs within the subsequent data message.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for signaling transmitter noise spurs.

FIG. 1 illustrates an example of a wireless communications system 100 that supports techniques for signaling transmitter noise spurs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless devices (e.g., UEs 115, base stations 105) of the wireless communications system 100 may be configured to support signaling and other configurations which enable Tx devices (e.g., UEs 115, base stations 105) to inform Rx devices (e.g., base stations 105, UEs 115) of the locations of spurs within signals that are to be transmitted by the Tx device. Techniques described herein enable Tx devices of the wireless communications system 100 to tell Rx devices where the Rx devices are expected to experience spurs, which may enable the Rx devices to more accurately and efficiently reduce the parasitic effects on the receiving end. For the purposes of the present disclosure, the terms "Tx device" and "Rx device" may be used to refer to a relative direction of communications, where any wireless device may be considered a Tx device or an Rx device depending on the communication to be performed. In this regard, UEs 115, base stations 105, and other wireless devices may be configured as a Tx device or an Rx device depending on the direction of communication.

For example, a Tx device (e.g., UE 115) may transmit a control message to an Rx device (e.g., base station 105), where the control message indicates locations (in the frequency domain) of spurs within a given span of resources (e.g., within a component carrier or BWP). The Tx device may be pre-configured with information regarding spurs generated by the Tx device based on calibration procedures performed during the fabrication of the Tx device. Subsequently, the Tx device may generate a data message within the span of resources (e.g., within the component carrier), and transmit the data message to the Rx device. Using knowledge of the frequency location of the spurs, the Rx device may be more able to address (e.g., mitigate, ignore) the spurs within the received data message.

In some cases, the Rx device may indicate, to the Tx device, which (if any) spur mitigation techniques the Rx device can/will implement. The Tx device may adjust how a message is transmitted (e.g., over which resources) based on the mitigation technique that will be implemented by the Rx device. For example, depending on the type of spur mitigation technique that will be performed by the Rx device, the Tx device may generate the data message such that data and/or pilots of the data are not transmitted at the locations of the noise spurs. Further, the Tx device may indicate (or the Rx device may request) a period of time before the transmitted data message in which the Tx device will transmit nulls or pilot signals (which will include spurs) that will enable the Rx device to more efficiently measure the noise spurs during the period of time, and use the measurements to address noise spurs within the subsequent data message.

Techniques described herein may enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system 100, which may reduce noise and improve a reliability of wireless communications within the wireless communications system 100.

Figure 2:
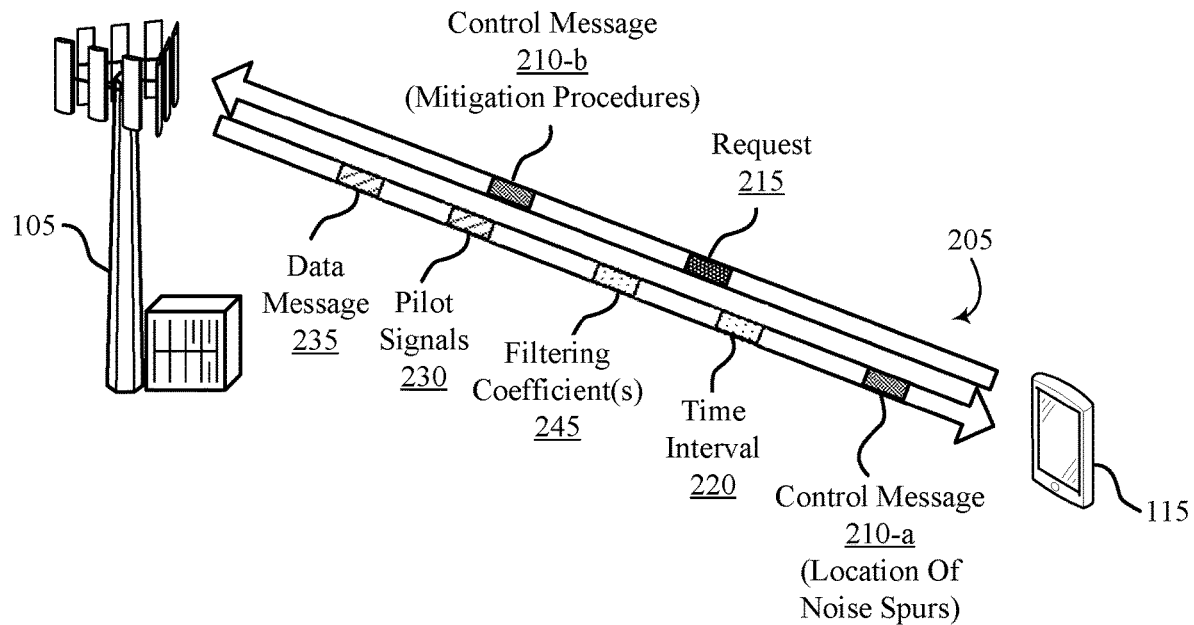
FIG. 2 illustrates an example of a wireless communications system that supports techniques for signaling transmitter noise spurs in accordance with aspects of the present disclosure.
Figure 2:
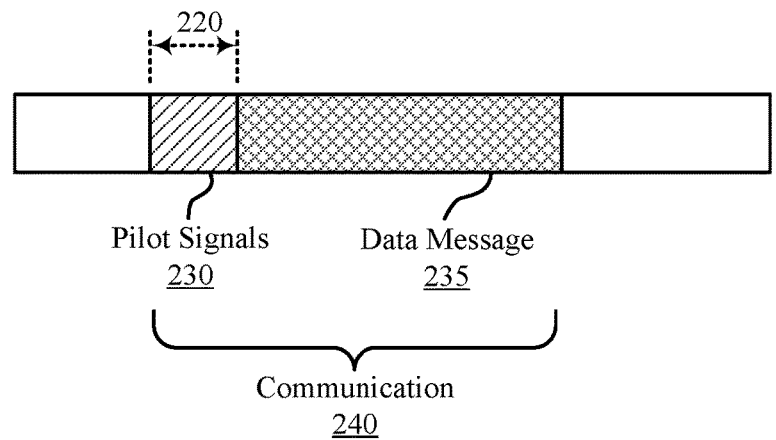

FIG. 2 illustrates an example of a wireless communications system 200 that supports techniques for signaling transmitter noise spurs in accordance with aspects of the present disclosure. In some aspects, aspects of the wireless communications system 200 may implement, or be implemented by, aspects of the wireless communications system 100. The wireless communications system 200 may include a base station 105 and a UE 115, which may be examples of base stations 105, UEs 115, and other wireless devices as described with reference to FIG. 1.

The UE 115 may communicate with the base station 105 using a communication link 205. The communication link 205 may include an example of an NR or LTE link between the UE 115 and the base station 105. In some cases, the communication link 205 may include examples of access links (e.g., Uu links) which may include bi-directional links which enable both uplink and downlink communication. For example, the UE 115 may transmit uplink signals, such as uplink control signals or uplink data signals, to the base station 105 using the communication link 205, and the base station 105 may transmit downlink signals, such as downlink control signals or downlink data signals, to the UE 115 using the communication link 205. In this regard, both the UE 115 and the base station 105 may be configured to act as a Tx device and an Rx device depending on the direction of the respective communication to be performed.

As noted previously herein, some wireless signaling may experience "noise spurs." Noise spurs are narrowband distortions resulting from intermodulation between different oscillator signals of a radio frequency that result in excessive channel noise at a specific tone in the frequency domain. Noise spurs may result in significant performance degradation in many wireless communications modems, including modems for LTE, 5G/NR, SUB6, Wi-Fi, V2X, and mmW communications. For example, Wi-Fi and 5G communications at a UE may result in noise "spikes," or spurs, at specific frequencies or tones. Specifically, noise spurs may result in performance degradation when spurs "hit," or overlap with, pilots for small allocations for all MCS, or any allocations with high MCS.

Noise spurs are a rising challenge, and will continue to become more prevalent due to the ever-increasing quantities of transmitters and receivers included within each wireless device. Moreover, the deployment of full-duplex (FD) communications will introduce additional noise spurs.

There are different techniques for addressing and minimizing noise spurs at an Rx device, including active noise spur mitigation techniques (e.g., TD techniques, FD techniques) and passive noise spur mitigation techniques (e.g., nulling techniques). Some current wireless devices attempt to deal with noise spurs on the Rx side by estimating phase and amplitude of the noise spurs and canceling the noise spurs using dedicated digital blocks based on the estimations. For example, using TD spur mitigation techniques, an Rx device may be able to estimate and identify spurs within received signals, and apply a "notch filter" to reduce an impact of the spur on the underlying signal. However, spur mitigation techniques performed at an Rx device may be complex and computationally expensive. Additionally, Rx-based spur mitigation techniques may be unable to completely eliminate spurs from a signal.

Further, mitigating/eliminating Tx spurs on the Tx side requires more complex transmitters with spatial isolation in the analog domain, which is extremely costly and difficult to perform with smaller wavelength communications such as 5G communications. As such, noise spur mitigation techniques from the Tx perspective may not be feasible for some wireless devices, and may be prohibitively expensive and difficult to achieve due to the size of antenna elements.

In the context of TD noise spur mitigation techniques for addressing noise spurs at an Rx device, noise spurs may be handled by the Rx device by applying a "notch filter." More specifically, the Rx device may employ a notch filter to filter out (e.g., suppress) spurs generated at the Rx device. To avoid saturation (e.g., when performing a Fast Fourier Transform (FFT)) and spur spreading in the frequency domain, the Rx device may use the notch filter to handle (e.g., filter) spurs in the time domain. The Rx device may perform measurements of a spur and may configure the notch filter to converge on the spur based on the performed measurements. For example, the Rx wireless device may measure one or more of a frequency, a phase, or an amplitude of a noise spur and may configure the notch filter to filter out (e.g., remove) signals with the measured frequency, phase, or amplitude.

In some cases, however, there may be a trade-off between a preciseness of the notch filter (e.g., how precise the notch filter is) a convergence time for the notch filter (e.g., a time the notch filter takes to converge on the spur). In other words, there may be an inverse relationship between convergence speed and distortion caused by the notch filter. As such, configuring the notch filter with a greater precision may be associated with a longer convergence time. In such cases, the wireless device may use a technique known as gear shifting to reduce the convergence time of the notch filter while maintaining a relatively high precision.

The gear shifting technique may enable the wireless device to calibrate the notch filter more efficiently such that it converges on the spur and reduces interference. To effectively perform gear shifting, the wireless device may measure and track characteristics of the spur. Convergence of the notch filter generally should take place during time periods which include noise spurs but do not include other signals (e.g., during time periods within a signal without data). Otherwise, the noise spur cancellation using the TD spur mitigation technique will not work well.

There are several methods that may be used to minimize (e.g., expedite) convergence of a notch filter used for TD spur mitigation techniques. One of the most common methods is the use of "gear shifting." In some aspects, gear shifting may speed up convergence of the notch filter to the spur. To perform gear shifting, the Rx device may iteratively configure the notch filter with increasing filtering coefficients (e.g., K values) until the notch filter has successfully converged on the spur. More specifically, the Rx device may increase a filtering coefficient (e.g., a convergence gear) of the notch filter based on a sample index corresponding to a measurement of the spur. In some cases, however, the notch filter may take a relatively long time to converge on the spur with an accuracy that avoids signal distortion (e.g., due to a frequency response of the notch filter), even when applying gear shifting techniques.

In some cases, a convergence gear (e.g., a filtering coefficient K) for a notch filter may be determined according to Equation 1 below:

$$\hat{d}[n] = \frac{1}{N}\sum_{k=1}^{N} x[k] \quad (1)$$

More specifically, Equation 1 may represent a machine learning or maximum likelihood (ML) mean estimator function used to perform gear shifting at the wireless device. In Equation 1, k and n may refer to sample numbers, and $\hat{d}$ and x may represent different signals at the Rx device.

Relationships derived from Equation 1 above are further illustrated in Equation 2 through Equation 6 below:

$$\hat{d}[1] = x[1] \quad (2)$$

$$\hat{d}[2] = \frac{\hat{d}[1]\cdot 1 + x[2]}{2} \quad (3)$$

$$\hat{d}[n] = \frac{\hat{d}[n-1]\cdot(n-1)+x[n]}{n} = \hat{d}[n-1] + \frac{1}{n}\cdot(x[n]-\hat{d}[n-1]) \quad (4)$$

$$\hat{d} - \hat{d}\cdot z^{-1}(1-\alpha) = \alpha\cdot x \quad (5)$$

$$\frac{\hat{d}}{x} = \frac{\alpha}{1-z^{-1}(1-\alpha)} \quad (6)$$

In Equation 2 through Equation 6 above, n may refer to a sample number, $\hat{d}$ and x may represent different signals at the wireless device, and z and $\alpha$ may represent filtering variables, where $$\frac{1}{n} = \alpha.$$

In some aspects, when performing a TD noise spur mitigation procedure, an Rx device may configure the notch filter in accordance with Equations 7-11 below. Equations 7-11 may be used to calculate a signal at the wireless device after removing a specific component (e.g., a direct current (DC) component) from the signal and estimating a frequency shift of the signal.

$$y[n] = x[n] - \hat{d}[n] \quad (7)$$

$$y = x\cdot\left(1-\frac{\hat{d}}{x}\right) = x\cdot\left(1 - \frac{\alpha}{1-z^{-1}\cdot(1-\alpha)}\right) = x\left(\frac{1-z^{-1}\cdot(1-\alpha)-\alpha}{1-z^{-1}\cdot(1-\alpha)}\right) \quad (8)$$

$$\frac{y}{x} = \frac{(1-\alpha)\cdot(1-z^{-1})}{1-z^{-1}\cdot(1-\alpha)} \quad (9)$$

$$\frac{y}{x} = \frac{(1-\alpha)\cdot(1-z^{-1}\cdot e^{-j\xi})}{1-z^{-1}\cdot e^{-j\xi}\cdot(1-\alpha)} \quad (10)$$

$$y[n] = (1-\alpha)\cdot(x[n] - e^{-j\xi}\cdot(x[n-1] + (1-\alpha)\cdot y[n-1])) \quad (11)$$

In Equations 7-11 above, n may refer to a sample number, $\hat{d}$ and x may represent different signals at the wireless device, z and $\alpha$ may represent filtering variables, y may refer to a filtered signal at the wireless device, and $\xi$ may be a variable used to estimate a shifted signal (e.g., shifted in frequency) at the Rx device. Additionally or alternatively, the wireless device may quantize a using a relationship (e.g., $$\alpha = \frac{1}{n} \cong 2^{-K}),$$

and may apply different filtering coefficients (e.g., different K values) to the notch filter to attain a desired convergence state. Thus, the wireless device may use gear shifting to speed up the convergence of the notch filter's state to a noise spur. As shown in Equations 7-11, even in case of optimal gear shifting, it takes time to converge to the desired spur for the higher values of K, which is required to avoid signal distortion due to the frequency response of the notch itself.

In some cases, however, the notch filter may be unable to converge on the spur if another signal (e.g., noise or data) is present at the wireless device. In such cases, the notch filter may converge on a combination of the spur and the other signal rather than converging on the spur alone. Thus, calibrating the notch filter in the presence of other signals may result in a relatively longer convergence period, thereby degrading performance of the notch filter. For example, calibrating the notch filter in the absence of other signals may result in a relatively short convergence time (e.g., a few microseconds), whereas calibrating the notch filter in the presence of other signals may result in a relatively long convergence time (e.g., tens of milliseconds).

In some cases, the wireless device may calibrate the notch filter in the presence of other signals based on pre-loading a state of the notch filter with a set of previously determined values corresponding to the noise spur. In such cases, the wireless Rx device may configure the notch filter with a filtering coefficient that is large enough to reduce adverse effects of the spur.

Additionally, or alternatively, Rx devices may utilize FD noise spur mitigation techniques to address Rx noise spurs. FD noise spur mitigation techniques address noise spurs in the frequency domain, and may be more challenging to implement due to increased complexity and modeling requirements. However, FD noise spur mitigation techniques do not experience convergence challenges experienced by TD noise spur mitigation techniques. One disadvantage is that FD noise spur mitigation techniques may cause clipping in the FFT block if the noise spur is strong enough, which may spread the energy of the noise spur over the spectrum.

TD and FD spur mitigation techniques/procedures may be referred to as "active" noise spur mitigation techniques/procedures, as the Rx device actively performs actions to address/mitigate the Rx noise spurs at the receiving end. Additionally, or alternatively, some Rx devices may be configured to implement "passive" noise spur mitigation techniques/procedures. As compared to active mitigation techniques in which the Rx device actively attempts to eliminate/mitigate noise spurs, passive mitigation techniques/procedures may include procedures in which the Rx device simply attempts to disregard or ignore noise spurs.

One example of a passive noise spur mitigation technique/procedure includes subcarrier nulling techniques (e.g., FD with subcarrier nulling techniques). In the context of a nulling procedure, an Rx device may identify tones (e.g., frequencies) including noise spurs, and may simply disregard or ignore the identified tones. In other words, frequencies/tones associated with noise spurs may be specially handled (e.g., ignored) in the context of passive noise spur mitigation techniques. For example, when an Rx device may not consider subcarriers associated with/including noise spurs if DRMS is allocated on the respective subcarriers as part of channel estimation. By way of another example, the Rx device may perform LLR zeroing (or whitening) at the input of the decoder if the noise spur hits (e.g., interferes/ overlaps with) the data. Such passive mitigation procedures may result in small performance losses at the Rx device, with minor added complexity. As such, passive mitigation procedures may be a more practical example compared to TD and FD noise spur mitigation procedures described above. However, passive noise spur mitigation techniques may be less effective as compared to active noise spur mitigation techniques.

As such, both active and passive noise spur mitigation techniques implemented by Rx devices exhibit shortcomings. Moreover, current noise spur mitigation techniques for mitigating Tx noise spurs require expensive spatial isolation and increased complexity, and may be unsuitable for many wireless devices.

Accordingly, aspects of the present disclosure are directed to a Tx-implemented noise spur mitigation techniques that may be used in addition to Rx-implemented noise spur mitigation techniques. In particular, the UE 115 and the base station 105 of the wireless communications system 200 may support signaling and other configurations which enable Tx devices to inform Rx devices of the locations of spurs within signals that are to be transmitted by the Tx device. In this regard, techniques described herein enable Tx devices to tell Rx devices where the Rx devices are expected to experience spurs, which may enable the Rx devices to more accurately and efficiently reduce the parasitic effects on the receiving end.

For the purposes of simplicity, the example shown and described in FIG. 2 may describe the base station 105 as the Tx device, and the UE 115 as the Rx device. However, this is not to be regarded as a limitation of the present disclosure, unless noted otherwise herein. Indeed, the noise spur mitigation techniques described herein may additionally or alternatively be implemented in cases where the UE 115 is the Tx device and the base station 105 is the Rx device.

As shown in FIG. 2, the base station 105 may transmit, to the UE 115, a control message 210-a indicating a location of one or more noise spurs associated with wireless communications performed by the base station 105. For example, the control message 210-a may indicate a frequency location of noise spurs in the frequency domain of a given set of resources. In other words, the base station 105 may indicate the exact frequency locations (e.g., tones) of the Tx noise spurs generated by the base station 105. The control message 210-a may include, but is not limited to, an RRC message, a MAC control element (MAC-CE) message, and the like.

In some aspects, the base station 105 may store information associated with noise spurs generated by the base station 105. For example, the base station 105 may store, in memory, a table or other data object indicating noise spurs and corresponding frequencies/tones for the respective noise spurs. In some cases, the base station 105 may be pre-configured with known noise spurs, which may be identified during manufacturing, fabrication, and calibration of the base station 105. In this regard, the base station 105 may transmit the control message 210 indicating the known/ stored locations of known noise spurs generated by the base station 105. Similarly, in cases where the UE 115 includes a Tx device, the UE 115 may be pre-configured with information regarding spurs generated by the UE 115 based on calibration procedures performed during the fabrication of the UE 115.

The base station 105 may indicate locations of noise spurs with different granularities. In some cases, the base station 105 may indicate locations of noise spurs on a component carrier-by-component carrier basis (e.g., per component carrier), a BWP-by-BWP basis (e.g., per BWP), and the like. For example, the base station 105 may transmit the control message 210-a and an additional control message, where the control message 210-a indicates a first set of noise spurs within a first component carrier, and where the second control message indicates a second set of noise spurs within a second component carrier. In other cases, the base station 105 may transmit a single control message 210 (e.g., control message 210-a) indicating all noise spurs generated by the base station 105 across all frequencies (e.g., across all frequencies of a given wireless spectrum used for wireless communications between the base station 105 and UE 115).

Additionally, or alternatively, the base station 105 may indicate locations of noise spurs on a beam-by-beam basis. In other words, the Tx device may indicate the state of noise spurs generated for each beam in cases where the noise spur behavior is different from beam to beam. For example, if in the middle of the slot the transmission configuration indicator (TCI) state and/or spatial relationship is not the same among symbols, the Tx device (e.g., base station 105) may indicate (as part of TCI-related information) the state of the noise spurs with respect to the given beams.

For example, the control message 210-a may indicate a spur location configuration associated with a first beam (e.g., Tx beam at the base station 105), where the spur location configuration includes/indicates the location of noise spurs generated within wireless communications performed using the first beam (and/or within the indicated set of resources). In this example, the spur location configuration may include a QCL type indicator associated with noise spurs (e.g., QCL-TypeS). In other words, QCL-TypeS may indicate the spur-related characteristics for respective beams (e.g., locations of spurs transmitted by the respective beams). In such cases, different beams (e.g., different Tx beams) may exhibit similar or different spur behavior within the same set of resources. As such, the base station 105 may indicate different spur location configurations (e.g., different QCL- TypeS) for different beams, where beams with the same spur location configurations (e.g., beams with the same QCL- TypeS) exhibit the same spur behavior.

In some aspects, QCL-TypeS indicators (e.g., beam-spur behavior) may be indicated in addition to, or in the alternate to, other QCL types, including QCL-TypeA (Doppler shift/ spread, average delay, delay spread), QCL-TypeB (Doppler shift/spread), QCL-TypeC (average delay, Doppler shift), QCL-TypeD (spatial Rx parameters), and the like.

The location of the noise spurs may be indicated in a variety of manners. For example, in some cases, the location of the noise spurs may be indicated as a percentage of an SCS and an anchor within the set of resources (e.g., percentage of SCS, with an anchor in the middle of the component carrier). In other cases, the location of the noise spurs may be indicated via subcarrier indexes (e.g., integer indexes of subcarriers affected by the noise spurs). In some cases, the manner in which the location of the noise spurs are indicated may be dependent on the noise spur mitigation techniques applied by the UE 115 for spur mitigation.

In some implementations, the base station 105 may receive, from the UE 115, a second control message 210-b indicating one or more noise spur mitigation procedures which are performable by the UE 115. For example, the UE 115 may indicate whether it is able to perform active mitigation procedures (e.g., TD mitigation procedure, FD mitigation procedure), passive mitigation procedures (e.g., nulling procedures), other mitigation procedures, or any combination thereof. In some aspects, the UE 115 may transmit the second control message 210-*b* indicating the supported noise spur mitigation procedures based on (e.g., in response to) receiving the control message 210-*a* indicating the location of noise spurs. The second control message 210-*a* may include, but is not limited to, an RRC message, a MAC-CE message, and the like.

As it is used herein, the term "active mitigation procedure" may include any mitigation procedure in which the UE 115 attempts to remove or filter noise spurs from communications received at the UE 115. Comparatively, the term "passive mitigation procedure" may include any mitigation procedure in which the UE 115 ignores frequencies (e.g., tones) associated with noise spurs within received communications.

In some aspects, the base station 105 may identify whether the UE 115 supports one or more active mitigation procedures (e.g., TD noise spur mitigation procedure, FD noise spur mitigation procedure), one or more passive mitigation procedures (e.g., nulling procedure), or both. The base station 105 may identify noise spur mitigation procedures supported by the UE 115 based on transmitting the control message 210-*a*, receiving the second control message 210-*b* indicating the supported mitigation procedures, or both. In some aspects, the behavior of the base station 105 may be dependent on the type of noise spur mitigation procedures that can/will be performed by the UE 115.

In some aspects, the base station 105 may receive, from the UE 115, a request 215 for a time interval 220 between a start of a communication 240 and a start of a data message 235 within the communication 240. In other words, the UE 115 may transmit a request 215 for a time interval 220 prior to a data message 235 in which the base station 105 will transmit nulls or pilot signals 230 so that the UE 115 may perform noise spur estimation. In this regard, the request 215 may indicate a requested time interval 220, or timing gap, in which the Tx spurs will exist (e.g., within nulls/pilot signals), but not the data. The request 215 at 315 may be communicated via an RRC message, a MAC-CE message, or both.

For example, as shown in FIG. 2, a communication 240 transmitted by the base station 105 may include a data message 235. In this example, the UE 115 may request a time interval 220 between a start of the communication and a start of the data message 235 within the communication 240 (e.g., how much time the communication 240 starts in advance of each slot but before the actual data begins). The time interval 220 may include a quantity of symbols, a portion (e.g., percentage) of a symbol length, or both. In this example, during the time interval 220, the base station 105 may be configured to transmit pilot signals 230 (e.g., nulls) which do not include data, but which include the noise spurs, to facilitate noise spur estimation by the UE 115 during the time interval.

The UE 115 may transmit the request 215 based on receiving the control message 210-*a* indicating the location of the noise spurs, transmitting the second control message 210-*b* indicating supported noise spur mitigation procedures, or both. For example, in cases where the UE 115 indicates that it supports active noise spur mitigation procedures via the second control message 210-*b*, the UE 115 may transmit the request 215 for the time interval 220 so that the UE 115 can perform noise spur estimation (e.g., phase/ frequency estimation) on noise spurs received during the time interval 220, where the noise spur estimation will be used to perform the supported active mitigation procedures.

Additionally, or alternatively, the base station 105 may transmit, to the UE 115, an indication of the time interval 220 between a start of a communication 240 and a start of a data message 235 within the communication 240. In other words, as shown in FIG. 2, the base station 105 may expressly indicate the time interval 220 prior to a data message 235 in which the base station 105 will transmit nulls or pilot signals 230 so that the UE 115 may perform noise spur estimation.

As noted previously herein, the time interval 220 may define a duration of time between the start of the communication 240 and the start of the data message 235 within the communication 240. Moreover, the time interval 220 may include a quantity of symbols, a portion (e.g., percentage) of a symbol length, or both. In some aspects, the base station 105 may transmit the indication of the time interval 220 based on transmitting the control message 210-*a* indicating the location of the noise spurs, receiving the second control message 210-*b* indicating supported noise spur mitigation procedures, identifying the noise spur mitigation procedures supported by the UE 115, receiving the request 215 for the time interval 220, or any combination thereof.

For example, the base station 105 may confirm the time interval 220 that was requested by the UE 115 via the request 215. In other cases, the base station 105 may indicate a different time interval 220 than the time interval 220 that was requested by the UE 115 via the request 215.

In some aspects, the base station 105 may determine a stability of the one or more noise spurs. The "stability" of the noise spurs may refer to any metric indicating a relative stability (or instability) of the noise spurs in the time domain, frequency domain, or both. As noted previously herein, the base station 105 may be pre-configured with information regarding the relative stability of generated noise spurs based on calibration procedures performed during the fabrication of the base station 105. In some cases, the base station 105 may determine the stability of the noise spurs in cases where the UE 115 supports TD spur mitigation procedures so that the base station 105 can recommend/ indicate one or more filtering coefficients 245 (e.g., gears) for notch filters that the UE 115 should apply.

For example, in cases where the base station 105 determines that the UE 115 supports a TD spur mitigation procedure (e.g., based on the second control message 210-*b*), the base station 105 may determine the stability of the noise spurs to determine the maximum gear (e.g., maximum filtering coefficient 245, maximum value of K) that the UE 115 should apply for the notch filter associated with the supported TD spur mitigation procedure. In such cases, the base station 105 may transmit, to the UE 115, an indication of one or more filtering coefficients 245 (e.g., gears, K values) associated with the notch filter at the UE 115. In other words, the base station 105 may indicate the maximum gear (e.g., maximum filtering coefficient 245, maximum value of K) that the UE 115 should apply for the notch filter associated with the supported TD spur mitigation procedure performed at the UE 115. In some aspects, the base station 105 may transmit the indication of the one or more filtering coefficients 245 based on the relative stability of the noise spurs.

In some aspects, the base station 105 may transmit one or more pilot signals 230 (e.g., nulls) to the UE 115. Pilot signals 230, or nulls, may include any signals that do not include actual data that is to be decoded by the UE 115. For example, as shown in FIG. 2, the base station 105 may transmit a communication 240 that includes one or more pilot signals 230 (e.g., nulls) and a data message 235.

As noted previously herein, the pilot signals 230 may be transmitted in the same set of resources (e.g., same component carrier, same BWP) as the one or more noise spurs, and may therefore include the one or more indicated spurs. As such, the transmission of the pilot signals 230/nulls may enable the UE 115 to estimate the frequency/phase of the noise spurs within the pilot signals 230 without data, which may enable the UE 115 to more efficiently address noise spurs within a subsequent data message 235.

In some aspects, the base station 105 may transmit the pilot signals 230 based on the type of noise spur mitigation procedure(s) that will be performed by the UE 115. In this regard, the base station 105 may transmit the pilot signals 230/nulls based on receiving the second control message 210-b indicating supported noise spur mitigation procedures, supported noise spur mitigation procedures supported by the UE 115, receiving the request 215 for a time interval 220 for nulls/pilot signals 230, transmitting the indication of the time interval 220, or any combination thereof.

For example, the base station 105 may transmit the pilot signals 230/nulls for at least the time interval 220 which was requested by the UE 115 (via the request 215) and/or indicated by the base station 105. For instance, as shown in FIG. 2, the base station 105 may transmit pilot signals 230 for a time interval 220 between a start of a communication 240 and a start of a data message 235 included within the communication 240.

In some aspects, the UE 115 may perform noise spur estimation. In some implementations, the UE 115 may perform noise spur estimation on one or more noise spurs included within the received pilot signals 230. For example, as shown in FIG. 2, the base station 105 may transmit pilot signals 230 for a time interval 220 between a start of a communication 240 and a start of a data message 235 included within the communication 240. In this example, the UE 115 may perform noise spur estimation (e.g., estimate frequency/phase) of the noise spurs received within the pilot signals 230 (e.g., nulls) received during the time interval 220. By estimating the frequency and/or phase of noise spurs within the set of resources, the UE 115 may be able to more efficiently and reliably identify and address noise spurs within subsequent data messages 235.

Subsequently, the base station 105 may generate a data message 235 that is to be communicated (e.g., transmitted) from the base station 105 to the UE 115. In particular, the base station 105 may generate a data message 235 that is to be transmitted using the set of resources (e.g., component carrier, BWP) that is associated with the one or more noise spurs. In other words, the base station 105 may generate a data message 235 within the same set of resources as the indicated noise spurs. In this regard, the generated data message 235 is likely to include the indicated noise spurs.

The base station 105 may generate the data message 235 based on transmitting the control message 210-a indicating the location of the noise spurs, receiving the second control message 210-b indicating supported noise spur mitigation procedures, identifying noise spur mitigation procedures supported by the UE 115, receiving the request 215 for the time interval 220, transmitting the indication of the time interval 220, transmitting the pilot signals 230, or any combination thereof.

For example, the base station 105 may generate the data message 235 based on the types of noise spur mitigation procedures supported by the UE 115. In particular, the behavior of the base station 105 may depend on the type of noise spur mitigation procedure that will be performed by the UE 115. For instance, in cases where the UE 115 only supports passive mitigation procedures (or will perform a passive mitigation procedure), the base station 105 may generate the data message 235 such that data of the data message 235, pilots of the data message 235 (e.g., pilots used for channel estimation), or both, are not transmitted on tones (frequencies) that are associated with the noise spurs. In other words, the base station 105 may generate/modify the data message 235 in such a manner that will enable the UE 115 to ignore, or otherwise disregard, tones associated with the noise spurs without significantly or materially affecting the reception/demodulation of the data message 235 at the UE 115.

The base station 105 may then transmit the data message 235 to the UE 115. In particular, the base station 105 may transmit the generated data message 235 to the UE 115 using the set of resources associated with the indicated noise spurs. In this regard, the transmitted data message 235 may be likely to include the indicated noise spurs associated with the respective set of resources.

Moreover, in cases where the base station 105 indicates the noise spur behavior with respect to a particular beam (e.g., Tx beam), the base station 105 may transmit the data message 235 using the indicated beam. For example, in cases where the control message 210-a (or another control message 210) indicates a spur location configuration (e.g., QCL-TypeS) associated with a Tx beam at the base station 105, the base station 105 may transmit the data message 235 using the indicated Tx beam.

The UE 115 may perform one or more noise spur mitigation procedures for the received data message 235. In particular, the UE 115 may perform a noise spur mitigation procedure which was indicated as being supported by the UE 115 via the second control message 210-b. The noise spur mitigation procedure performed by the UE 115 may include an active mitigation procedure (e.g., TD mitigation procedure, FD mitigation procedure), passive mitigation procedure (e.g., nulling procedure), or both. For example, in the context of an active mitigation procedure, the UE 115 may perform the active mitigation procedure in accordance with the noise spur estimation performed on the pilot signals 230 during the time interval 220. By way of another example, in the context of a TD mitigation procedure, the UE 115 may perform the TD mitigation procedure using a notch filter and the indicated filtering coefficients 245 for the notch filter which were received from the base station 105.

In some cases, noise spurs may be out-of-band for one Rx device, but may be in-band for another Rx device. For example, in some cases, the location of the noise spurs indicated via the control message 210-a may be out-of-band for the UE 115, but may be in-band for another Rx device (e.g., another UE 115, another base station 105). As such, in some implementations, Rx devices may be configured to forward/relay control messages 210 indicating locations of noise spurs to other Rx devices. For instance, upon receiving the control message 210-a indicating the location of the noise spurs, the UE 115 may relay, or forward, the control message 210-a to other potential Rx devices, such as other UEs 115 or other base stations 105. In this example, the other Rx devices which receive the relayed control message 210-a may be able to more efficiently identify and address noise spurs received from the base station 105. Similarly, the base station 105 may be configured to communicate (e.g., broadcast) locations of Tx spurs to any potential Rx devices, including the UE 115, other UEs 115, other base stations 105, and the like.

Techniques described herein may enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system 200, which may reduce noise and improve a reliability of wireless communications within the wireless communications system 200.

Figure 3:
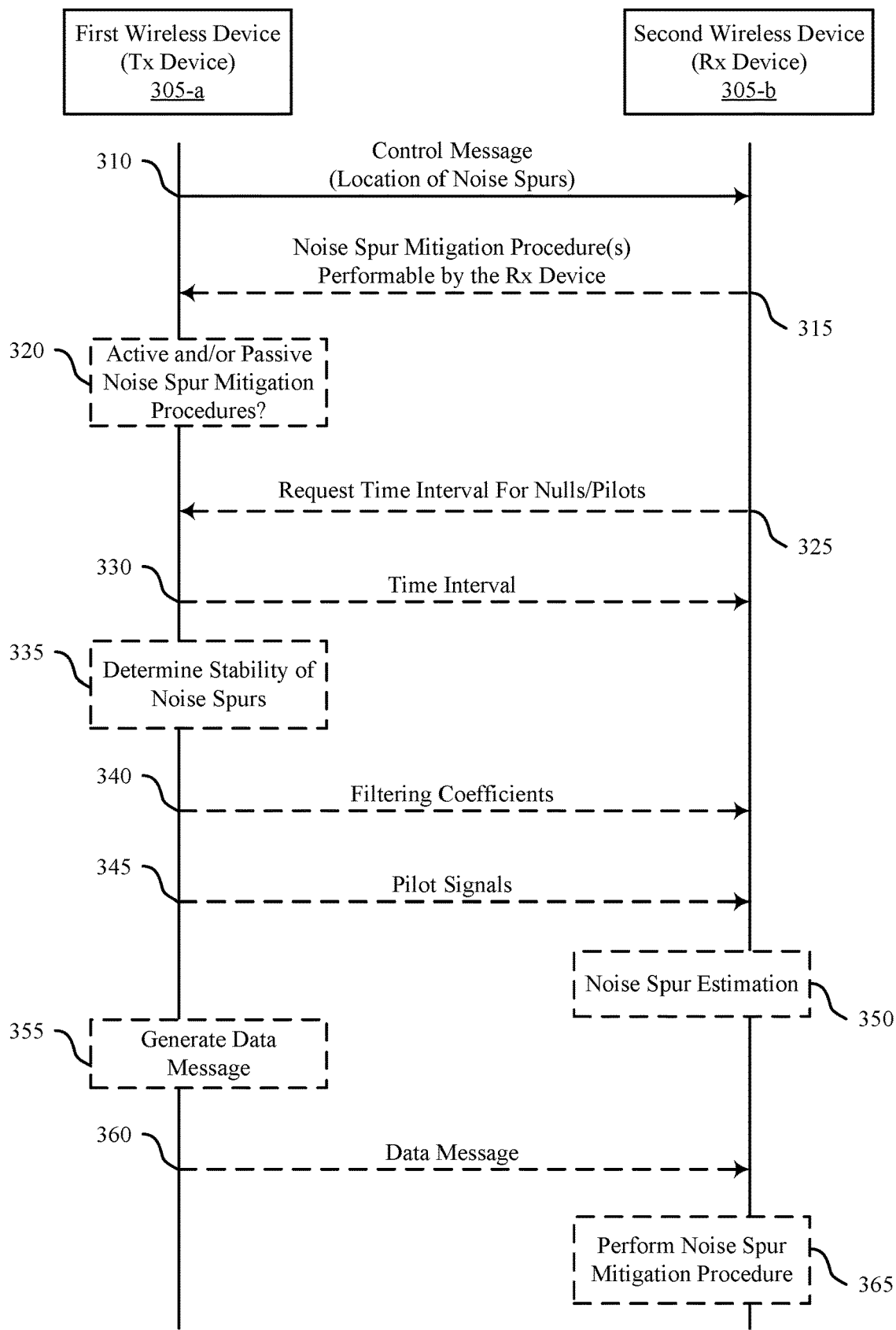
FIG. 3 illustrates an example of a process flow that supports techniques for signaling transmitter noise spurs in accordance with aspects of the present disclosure.

FIG. 3 illustrates an example of a process flow 300 that supports techniques for signaling transmitter noise spurs in accordance with aspects of the present disclosure. In some examples, process flow 300 may implement, or be implemented by, aspects of wireless communications system 100, wireless communications system 200, or both. For example, the process flow 300 may illustrate techniques which enable a first wireless device 305-a (e.g., Tx device) to indicate frequency locations of noise spurs generated within wireless communications performed by the first wireless device 305-a, thereby enabling a second wireless device 305-b (e.g., Rx device) to more efficiently and effectively identify and address (e.g., filter out, ignore) noise spurs within messages received from the first wireless device 305-a, as described with reference to FIGS. 1 and 2.

In some cases, process flow 300 may include a first wireless device 305-a (Tx device) and a second wireless device 305-b (Rx device). The first and second wireless devices 305 may include any wireless device, including UEs 115, base stations 105, IAB nodes, and the like. For example, in some cases, the first wireless device 305-a may include a UE 115 and the second wireless device 305-b may include a base station 105. By way of another example, in other cases, the first wireless device 305-a may include a base station 105 and the second wireless device 305-b may include a UE 115. In additional or alternative cases, both the first and second wireless devices 305 may include UEs 115 or base stations 105.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 310, the first wireless device 305-a may transmit, to the second wireless device 305-b, a control message indicating a location of one or more noise spurs associated with wireless communications performed by the first wireless device 305-a. For example, the control message may indicate a frequency location of noise spurs in the frequency domain of a given set of resources. In other words, the first wireless device 305-a may indicate the exact frequency locations (e.g., tones) of the Tx noise spurs. The control message may include, but is not limited to, an RRC message, a MAC-CE message, and the like.

In some aspects, the first wireless device 305-a may store information associated with noise spurs generated by the first wireless device 305-a. For example, the first wireless device 305-a may store, in memory, a table or other data object indicating noise spurs and corresponding frequencies/tones for the respective noise spurs that are generated within wireless communications transmitted by the first wireless device 305-a. In some cases, the first wireless device 305-a may be pre-configured with known noise spurs, which may be identified during manufacturing, fabrication, and calibration of the first wireless device 305-a. In this regard, the first wireless device 305-a may transmit the control message indicating the known/stored locations of known noise spurs generated by the first wireless device 305-a.

The first wireless device 305-a may indicate locations of noise spurs with different granularities. In some cases, the first wireless device 305-a may indicate locations of noise spurs on a component carrier-by-component carrier basis (e.g., per component carrier), a BWP-by-BWP basis (e.g., per BWP), and the like. For example, the first wireless device 305-a may transmit first and second control messages, where the first control message indicates a first set of noise spurs within a first component carrier, and where the second control message indicates a second set of noise spurs within a second component carrier. In other cases, the first wireless device 305-a may transmit a single control message indicating all noise spurs generated by the first wireless device 305-a across all frequencies (e.g., across all frequencies of a given wireless spectrum used for wireless communications between the respective wireless devices 305-a, 305-b).

Additionally, or alternatively, the first wireless device 305-a may indicate locations of noise spurs on a beam-by-beam basis. For example, the control message may indicate a spur location configuration associated with a first beam (e.g., Tx beam at the first wireless device 305-a), where the spur location configuration includes/indicates the location of noise spurs generated within wireless communications performed using the first beam (and/or within the indicated set of resources). In this example, the spur location configuration may include a QCL type indicator associated with noise spurs (e.g., QCL-TypeS). In such cases, different beams (e.g., different Tx beams) may exhibit similar or different spur behavior within the same set of resources. As such, the first wireless device 305-a may indicate different spur location configurations (e.g., different QCL-TypeS) for different beams, where beams with the same spur location configurations (e.g., beams with the same QCL-TypeS) exhibit the same spur behavior.

The location of the noise spurs may be indicated in a variety of manners. For example, in some cases, the location of the noise spurs may be indicated as a percentage of an SCS and an anchor within the set of resources (e.g., percentage of SCS, with an anchor in the middle of the component carrier). In other cases, the location of the noise spurs may be indicated via subcarrier indexes (e.g., integer indexes of subcarriers affected by the noise spurs). In some cases, the manner in which the location of the noise spurs are indicated may be dependent on the noise spur mitigation techniques applied by the second wireless device 305-b for spur mitigation.

At 315, the first wireless device 305-a may receive, from the second wireless device 305-b, a second control message indicating one or more noise spur mitigation procedures which are performable by the second wireless device 305-b. For example, the second wireless device 305-b may indicate whether it is able to perform active mitigation procedures (e.g., TD mitigation procedure, FD mitigation procedure), passive mitigation procedures (e.g., nulling procedures), other mitigation procedures, or any combination thereof. In some aspects, the second wireless device 305-b may transmit the second control message indicating the supported noise spur mitigation procedures based on (e.g., in response to) receiving the control message at 310 indicating the location of noise spurs. The second control message at 315 may include, but is not limited to, an RRC message, a MAC-CE message, and the like.

As noted previously herein, active mitigation procedures may include any mitigation procedure in which the second wireless device 305-*b* attempts to remove or filter noise spurs from communications received at the second wireless device 305-*b*. Comparatively, passive mitigation procedures may include any mitigation procedure in which the second wireless device 305-*b* ignores frequencies (e.g., tones) associated with noise spurs within received communications.

At 320, the first wireless device 305-*a* may identify whether the second wireless device 305-*b* supports one or more active mitigation procedures (e.g., TD noise spur mitigation procedure, FD noise spur mitigation procedure), one or more passive mitigation procedures (e.g., nulling procedure), or both. The first wireless device 305-*a* may identify noise spur mitigation procedures supported by the second wireless device 305-*b* based on transmitting the control message at 310, receiving the second control message at 315, or both. In some aspects, as described previously herein, the behavior of the first wireless device 305-*a* may be dependent on the type of noise spur mitigation procedures that can/will be performed by the second wireless device 305-*b*.

At 325, the first wireless device 305-*a* may receive, from the second wireless device 305-*b*, a request for a time interval between a start of a communication and a start of a data message within the communication. In other words, as shown in FIG. 2, the second wireless device 305-*b* may request a time interval 220 prior to a data message 235 in which the first wireless device 305-*a* will transmit nulls or pilot signals so that the second wireless device 305-*b* may perform noise spur estimation. In some cases, the time interval may define a duration of time between the start of the communication and the start of the data message within the communication. Moreover, the time interval may include a quantity of symbols, a portion (e.g., percentage) of a symbol length, or both. The request at 315 may be communicated via an RRC message, a MAC-CE message, or both.

The second wireless device 305-*b* may transmit the request at 325 based on receiving the control message indicating the location of the noise spurs at 310, transmitting the second control message indicating supported noise spur mitigation procedures at 315, or both. For example, in cases where the second wireless device 305-*b* indicates that it supports active noise spur mitigation procedures at 315, the second wireless device 305-*b* may transmit the request for the time interval at 325 so that the second wireless device 305-*b* can perform noise spur estimation (e.g., phase/frequency estimation) on noise spurs received during the time interval, where the noise spur estimation will be used to perform the supported active mitigation procedures.

At 330, the first wireless device 305-*a* may transmit, to the second wireless device 305-*b*, an indication of the time interval between a start of a communication and a start of a data message within the communication. In other words, as shown in FIG. 2, the first wireless device 305-*a* may indicate the time interval 220 prior to a data message 235 in which the first wireless device 305-*a* will transmit nulls or pilot signals so that the second wireless device 305-*b* may perform noise spur estimation.

As noted previously herein, the time interval may define a duration of time between the start of the communication and the start of the data message within the communication. Moreover, the time interval may include a quantity of symbols, a portion (e.g., percentage) of a symbol length, or both. In some aspects, the first wireless device 305-*a* may transmit the indication of the time interval at 330 based on transmitting the control message indicating the location of the noise spurs at 310, receiving the second control message indicating supported noise spur mitigation procedures at 315, identifying the supported noise spur mitigation procedures at 320, receiving the request for the time interval at 335, or any combination thereof.

For example, the first wireless device 305-*a* may confirm the time interval that was requested by the second wireless device 305-*b* via the request at 325. In other cases, the first wireless device 305-*a* may indicate a different time interval than the time interval that was requested by the second wireless device 305-*b* at 325.

At 335, the first wireless device 305-*a* may determine a stability of the one or more noise spurs. The "stability" of the noise spurs may refer to any metric indicating a relative stability (or instability) of the noise spurs in the time domain, frequency domain, or both. As noted previously herein, the first wireless device 305-*a* may be pre-configured with information regarding the relative stability of generated noise spurs based on calibration procedures performed during the fabrication of the first wireless device 305-*a*.

In some cases, the first wireless device 305-*a* may determine the stability of the noise spurs in cases where the second wireless device 305-*b* supports a TD spur mitigation procedures so that the first wireless device 305-*a* can recommend/indicate one or more filtering coefficients (e.g., gears) for notch filters that the second wireless device 305-*b* should apply. For example, in cases where the first wireless device 305-*a* determines that the second wireless device 305-*b* supports TD spur mitigation procedure at 320 (e.g., based on the second control message at 315), the first wireless device 305-*a* may determine the stability of the noise spurs to determine the maximum gear (e.g., maximum filtering coefficient, maximum value of K) that the second wireless device 305-*b* should apply for the notch filter associated with the supported TD spur mitigation procedure.

At 340, the first wireless device 305-*a* may transmit, to the second wireless device 305-*b*, an indication of one or more filtering coefficients (e.g., gears, K values) associated with a notch filter at the second wireless device 305-*b*. In other words, the first wireless device 305-*a* may indicate the maximum gear (e.g., maximum filtering coefficient, maximum value of K) that the second wireless device 305-*b* should apply for the notch filter associated with the supported TD spur mitigation procedure performed at the second wireless device 305-*b*. In some aspects, the first wireless device 305-*a* may transmit the indication of the one or more filtering coefficients at 340 based on the relative stability of the noise spurs that was determined at 335.

At 345, the first wireless device 305-*a* may transmit one or more pilot signals (e.g., nulls) to the second wireless device 305-*b*. Pilot signals, or nulls, may include any signals that do not include actual data that is to be decoded by the second wireless device 305-*b*. For example, as shown in FIG. 2, the first wireless device 305-*a* may transmit a communication 240 that includes one or more pilot signals 230 (e.g., nulls) and a data message 235.

As noted previously herein, the pilot signals transmitted at 345 may be transmitted in the same set of resources (e.g., same component carrier, same BWP) as the one or more noise spurs, and may therefore include the one or more indicated spurs. As such, the transmission of the pilot signals/nulls at 345 may enable the second wireless device 305-*b* to estimate the frequency/phase of the noise spurs within the pilot signals without data, which may enable the second wireless device 305-*b* to more efficiently address noise spurs within a subsequent data message.

In some aspects, the first wireless device 305-*a* may transmit the pilot signals based on the type of noise spur mitigation procedure(s) that will be performed by the second wireless device 305-*b*. In this regard, the first wireless device 305-*a* may transmit the pilot signals/nulls based on receiving the second control message indicating supported noise spur mitigation procedures at 315, identifying supported noise spur mitigation procedures at 320, receiving the request for a time interval for nulls/pilots at 325, transmitting the indication of the time interval at 330, or any combination thereof.

For example, the first wireless device 305-*a* may transmit the pilot signals/nulls at 345 for at least the time interval which was requested at 325 and/or indicated at 330. For instance, as shown in FIG. 2, the first wireless device 305-*a* may transmit pilot signals 230 for a time interval 220 between a start of a communication 240 and a start of a data message 235 included within the communication 240.

At 350, the second wireless device 305-*b* may perform noise spur estimation. In some implementations, the second wireless device 305-*b* may perform noise spur estimation on one or more noise spurs included within the pilot signals received at 345. For example, as shown in FIG. 2, the first wireless device 305-*a* may transmit pilot signals 230 for a time interval 220 between a start of a communication 240 and a start of a data message 235 included within the communication 240. In this example, the second wireless device 305-*b* may perform noise spur estimation (e.g., estimate frequency/phase) of the noise spurs received within the pilot signals 230 (e.g., nulls) received during the time interval 220. By estimating the frequency and/or phase of noise spurs within the set of resources at 350, the second wireless device 305-*b* may be able to more efficiently and reliably identify and address noise spurs within subsequent data messages.

At 355, the first wireless device 305-*a* may generate a data message that is to be communicated (e.g., transmitted) from the first wireless device 305-*a* to the second wireless device 305-*b*. In particular, the first wireless device 305-*a* may generate a data message that is to be transmitted using the set of resources (e.g., component carrier, BWP) that is associated with the one or more noise spurs. In other words, the first wireless device 305-*a* may generate a data message within the same set of resources as the indicated noise spurs. In this regard, the generated data message is likely to include the indicated noise spurs.

The first wireless device 305-*a* may generate the data message at 355 based on transmitting the control message indicating the location of the noise spurs at 310, receiving the second control message indicating supported noise spur mitigation procedures at 315, identifying supported noise spur mitigation procedures at 320, receiving the request for the time interval at 325, transmitting the indication of the time interval at 330, transmitting the pilot signals at 345, or any combination thereof.

For example, the first wireless device 305-*a* may generate the data message based on the types of noise spur mitigation procedures supported by the second wireless device 305-*b*. In particular, the behavior of the first wireless device 305-*a* may depend on the type of noise spur mitigation procedure that will be performed by the second wireless device 305-*b*. For instance, in cases where the second wireless device 305-*b* only supports passive mitigation procedures (or will perform a passive mitigation procedure), the first wireless device 305-*a* may generate the data message such that data of the data message, pilots of the data message (e.g., pilots used for channel estimation), or both, are not transmitted on tones (frequencies) that are associated with the noise spurs. In other words, the first wireless device 305-*a* may generate/modify the data message in such a manner that will enable the second wireless device 305-*b* to ignore, or otherwise disregard, tones associated with the noise spurs without significantly or materially affecting the reception/demodulation of the data message at the second wireless device 305-*b*.

At 360, the first wireless device 305-*a* may transmit, to the second wireless device 305-*b*, the data message that was generated at 355. In particular, the first wireless device 305-*a* may transmit the generated data message to the second wireless device 305-*b* using the set of resources associated with the indicated noise spurs. In this regard, the transmitted data message may be likely to include the indicated noise spurs associated with the respective set of resources.

Moreover, in cases where the first wireless device 305-*a* indicates the noise spur behavior with respect to a particular beam (e.g., Tx beam), the first wireless device 305-*a* may transmit the data message using the indicated beam. For example, in cases where the control message at 310 (or another control message) indicates a spur location configuration (e.g., QCL-TypeS) associated with a Tx beam at the first wireless device 305-*a*, the first wireless device 305-*a* may transmit the data message using the indicated Tx beam.

At 365, the second wireless device 305-*b* may perform one or more noise spur mitigation procedures for the received data message. In particular, the second wireless device 305-*b* may perform a noise spur mitigation procedure which was indicated as being supported by the second wireless device 305-*b* via the second control message at 315.

The noise spur mitigation procedure performed at 365 may include an active mitigation procedure (e.g., TD mitigation procedure, FD mitigation procedure), passive mitigation procedure (e.g., nulling procedure), or both. For example, in the context of an active mitigation procedure, the second wireless device 305-*b* may perform the active mitigation procedure at 365 in accordance with the noise spur estimation performed on the pilot signals at 350. By way of another example, in the context of a TD mitigation procedure, the second wireless device 305-*b* may perform the TD mitigation procedure using a notch filter and the indicated filtering coefficients for the notch filter which were received at 340.

Techniques described herein may enable the first wireless device 305-*a* to indicate frequency locations of noise spurs within wireless communications transmitted by the first wireless device 305-*a*, which may enable the second wireless device 305-*b* to more efficiently and effectively identify and address (e.g., filter out, ignore) received noise spurs. As such, techniques described herein may mitigate parasitic effects of noise spurs within the wireless communications system, which may reduce noise and improve a reliability of wireless communications within the wireless communications system.

Figure 4:
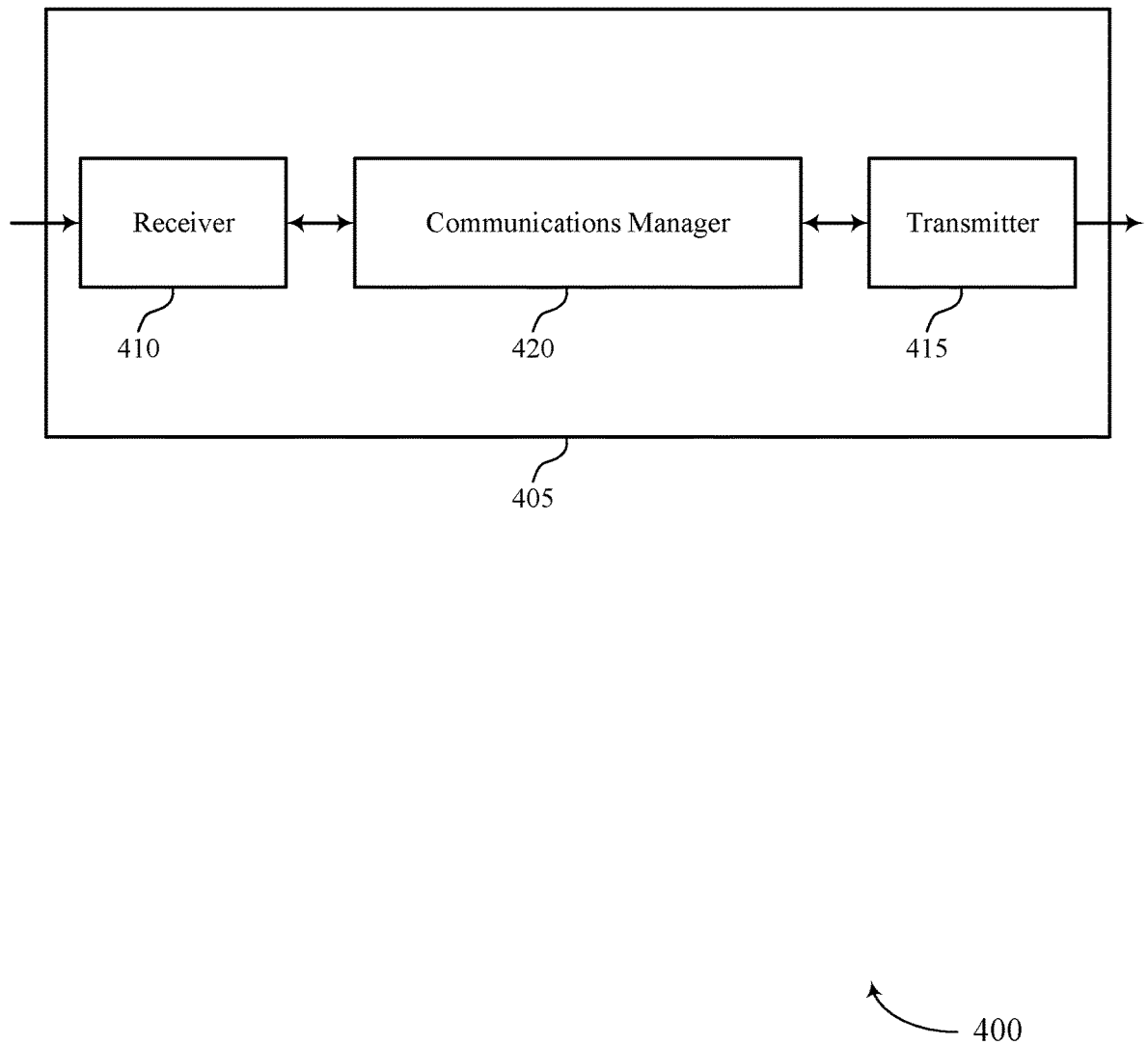
FIGS. 4 and 5 show block diagrams of devices that support techniques for signaling transmitter noise spurs in accordance with aspects of the present disclosure.

FIG. 4 shows a block diagram 400 of a device 405 that supports techniques for signaling transmitter noise spurs in accordance with aspects of the present disclosure. The device 405 may be an example of aspects of a Tx device (e.g., UE 115, base station 105), as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for signaling transmitter noise spurs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for signaling transmitter noise spurs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for signaling transmitter noise spurs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first wireless device in accordance with examples as disclosed herein. For example, the communications manager 420 may be configured as or otherwise support a means for transmitting, to a second wireless device, a control message indicating a location of one or more noise spurs associated with wireless communications performed by the first wireless device using a set of resources, where the location includes a frequency location of the one or more noise spurs in a frequency domain of the set of resources. The communications manager 420 may be configured as or otherwise support a means for generating a data message to be communicated from the first wireless device to the second wireless device using the set of resources associated with the one or more noise spurs based on transmitting the control message. The communications manager 420 may be configured as or otherwise support a means for transmitting the generated data message to the second wireless device using the set of resources associated with the one or more noise spurs.

By including or configuring the communications manager 420 in accordance with examples as described herein, the device 405 (e.g., a processor controlling or otherwise coupled to the receiver 410, the transmitter 415, the communications manager 420, or a combination thereof) may support techniques that enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system, which may reduce noise and improve a reliability of wireless communications within the wireless communications system.

Figure 5:
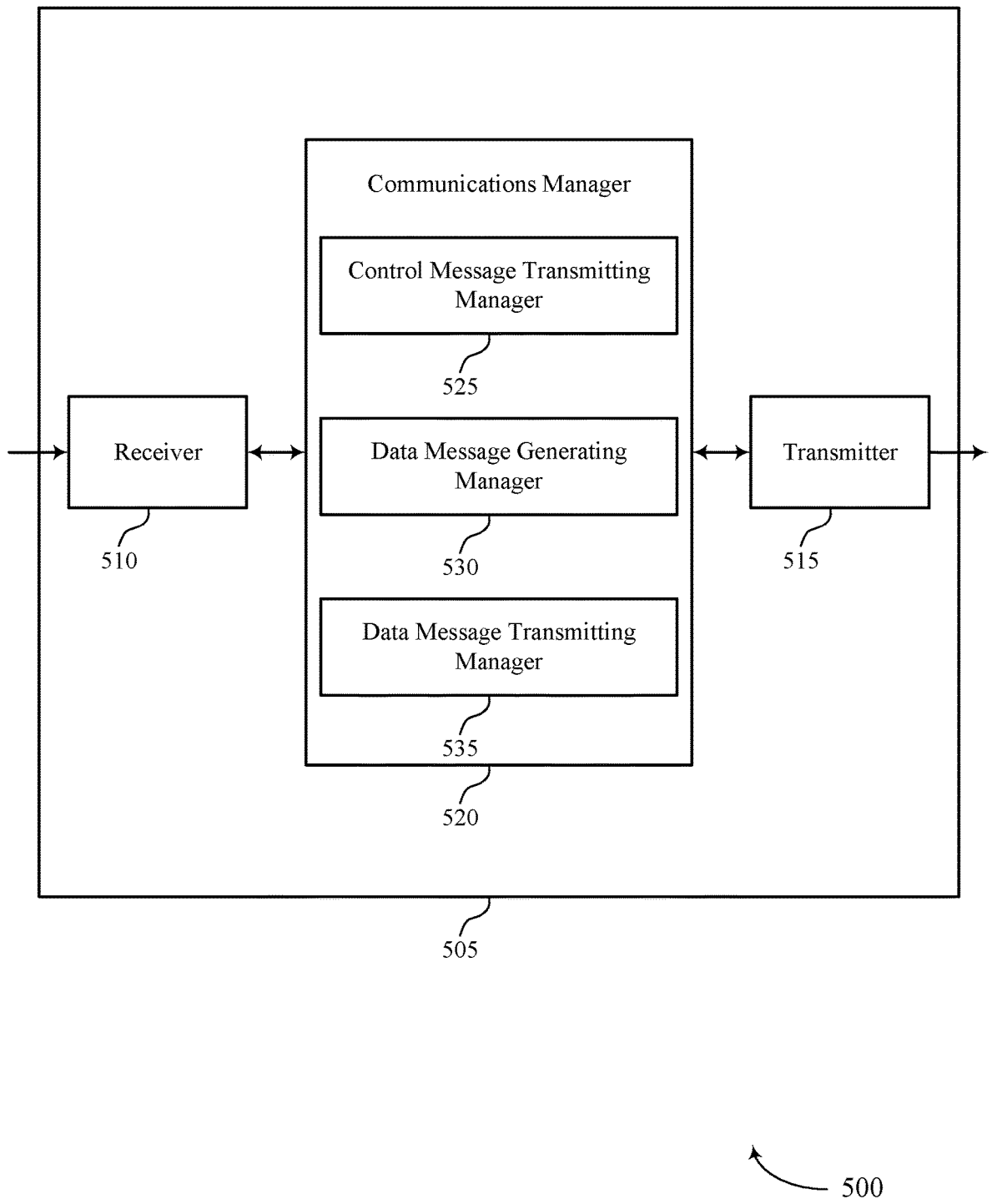

FIG. 5 shows a block diagram 500 of a device 505 that supports techniques for signaling transmitter noise spurs in accordance with aspects of the present disclosure. The device 505 may be an example of aspects of a Tx device 405 (e.g., UE 115, base station 105) as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for signaling transmitter noise spurs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for signaling transmitter noise spurs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for signaling transmitter noise spurs as described herein. For example, the communications manager 520 may include a control message transmitting manager 525, a data message generating manager 530, a data message transmitting manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. The control message transmitting manager 525 may be configured as or otherwise support a means for transmitting, to a second wireless device, a control message indicating a location of one or more noise spurs associated with wireless communications performed by the first wireless device using a set of resources, where the location includes a frequency location of the one or more noise spurs in a frequency domain of the set of resources. The data message generating manager 530 may be configured as or otherwise support a means for generating a data message to be communicated from the first wireless device to the second wireless device using the set of resources associated with the one or more noise spurs based on transmitting the control message. The data message transmitting manager 535 may be configured as or otherwise support a means for transmitting the generated data message to the second wireless device using the set of resources associated with the one or more noise spurs.

Figure 6:
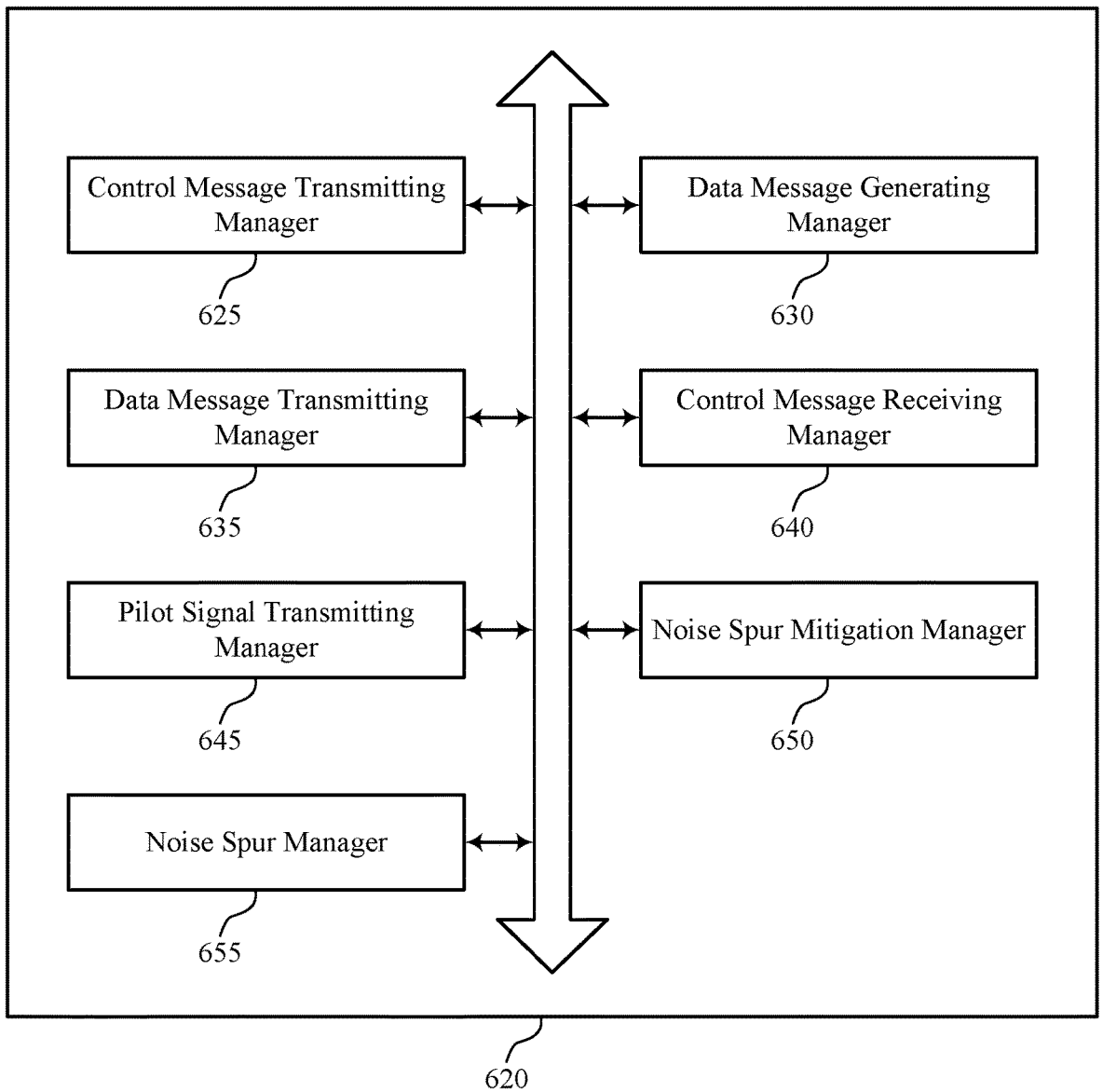
FIG. 6 shows a block diagram of a communications manager that supports techniques for signaling transmitter noise spurs in accordance with aspects of the present disclosure.

FIG. 6 shows a block diagram 600 of a communications manager 620 that supports techniques for signaling transmitter noise spurs in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for signaling transmitter noise spurs as described herein. For example, the communications manager 620 may include a control message transmitting manager 625, a data message generating manager 630, a data message transmitting manager 635, a control message receiving manager 640, a pilot signal transmitting manager 645, a noise spur mitigation manager 650, a noise spur manager 655, or any combination thereof. Each of these components may communicate, directly or indirectly, with one another (e.g., via one or more buses).

The communications manager 620 may support wireless communication at a first wireless device in accordance with examples as disclosed herein. The control message transmitting manager 625 may be configured as or otherwise support a means for transmitting, to a second wireless device, a control message indicating a location of one or more noise spurs associated with wireless communications performed by the first wireless device using a set of resources, where the location includes a frequency location of the one or more noise spurs in a frequency domain of the set of resources. The data message generating manager 630 may be configured as or otherwise support a means for generating a data message to be communicated from the first wireless device to the second wireless device using the set of resources associated with the one or more noise spurs based on transmitting the control message. The data message transmitting manager 635 may be configured as or otherwise support a means for transmitting the generated data message to the second wireless device using the set of resources associated with the one or more noise spurs.

In some examples, the control message transmitting manager 625 may be configured as or otherwise support a means for transmitting, via the control message, an indication of a spur location configuration associated with a first beam, the spur location configuration including the location of the one or more noise spurs associated with wireless communications performed by the first wireless device using the first beam and the set of resources, where the data message is transmitted via the first beam.

In some examples, the control message transmitting manager 625 may be configured as or otherwise support a means for transmitting, via the control message, a second control message, or both, an indication of a second beam associated with the spur location configuration, the spur location configuration including the location of the one or more noise spurs associated with wireless communications performed by the first wireless device using the second beam and the set of resources. In some examples, the data message transmitting manager 635 may be configured as or otherwise support a means for transmitting a second data message to the second wireless device using the second beam and the set of resources in response to transmitting the control message, the second control message, or both.

In some examples, the control message transmitting manager 625 may be configured as or otherwise support a means for transmitting, via the control message, a second control message, or both, an indication of a second spur location configuration associated with a second beam, the second spur location configuration including a second location of one or more additional noise spurs associated with wireless communications performed by the first wireless device using the second beam and the set of resources. In some examples, the data message transmitting manager 635 may be configured as or otherwise support a means for transmitting a second data message to the second wireless device using the second beam and the set of resources in response to transmitting the control message, the second control message, or both.

In some examples, the indication of the spur location configuration includes a QCL type indicator associated with noise spurs.

In some examples, the control message receiving manager 640 may be configured as or otherwise support a means for receiving, from the second wireless device and based on transmitting the control message, a second control message indicating one or more noise spur mitigation procedures performable by the second wireless device, where generating the data message, transmitting the data message, or both, is based on the one or more noise spur mitigation procedures.

In some examples, to support generating the data message, the data message generating manager 630 may be configured as or otherwise support a means for generating the data message, based on the one or more noise spur mitigation procedures, such that a pilot signal associated with the data message, data within the data message, or both, is transmitted at a second frequency location in the frequency domain of the set of resources that is different from the frequency location of the one or more noise spurs.

In some examples, the data message includes a portion of a communication transmitted by the first wireless device, and the control message transmitting manager 625 may be configured as or otherwise support a means for transmitting, based on the one or more noise spur mitigation procedures, an indication of a time interval between a start of the communication and a start of the data message within the communication, where generating the data message, transmitting the data message, or both, are based on the time interval.

In some examples, the pilot signal transmitting manager 645 may be configured as or otherwise support a means for transmitting a set of pilot signals within the time interval using the set of resources associated with the one or more noise spurs. In some examples, the indication of the time interval includes an indication of a portion of a symbol length between the start of the communication and the start of the data message within the communication.

In some examples, the one or more noise spur mitigation procedures include an active mitigation procedure in which the second wireless device attempts to remove or filter noise spurs from received communications, a passive mitigation procedure in which the second wireless device ignores tones associated with noise spurs within received communications, or both, the active mitigation procedure including a time-domain mitigation procedure, a frequency-domain mitigation procedure, or both, and the passive mitigation procedure including a nulling procedure.

In some examples, the noise spur mitigation manager 650 may be configured as or otherwise support a means for identifying whether the one or more noise spur mitigation procedures performable by the second wireless device include an active mitigation procedure, a passive mitigation procedure, or both, where generating the data message, transmitting the data message, or both, is based on the identifying.

In some examples, the noise spur mitigation procedure includes a time-domain mitigation procedure associated with a notch filter, and the control message transmitting manager 625 may be configured as or otherwise support a means for transmitting, to the second wireless device and in response to the noise spur mitigation procedure, an indication of one or more filtering coefficients associated with the notch filter.

In some examples, the noise spur manager 655 may be configured as or otherwise support a means for identifying a stability of the one or more noise spurs associated with the set of resources. In some examples, the noise spur manager 655 may be configured as or otherwise support a means for determining the one or more filtering coefficients based on the stability.

In some examples, the data message includes a portion of a communication transmitted by the first wireless device, and the control message receiving manager 640 may be configured as or otherwise support a means for receiving, from the second wireless device and based on transmitting the control message, a request for a time interval between a start of the communication and a start of the data message within the communication, where generating the data message, transmitting the data message, or both, are based on the request, the time interval, or both.

In some examples, to support transmitting the data message, the pilot signal transmitting manager 645 may be configured as or otherwise support a means for transmitting one or more pilot signals within the communication for at least the time interval prior to transmitting the data message based on the request.

In some examples, the set of resources includes a first component carrier, and the control message transmitting manager 625 may be configured as or otherwise support a means for transmitting, via the control message, an additional control message, or both, an indication of a second location of one or more additional noise spurs associated with wireless communications performed by the first wireless device using a second component carrier, where the second location includes a second frequency location of the one or more additional noise spurs in a frequency domain of the second component carrier.

In some examples, the control message includes an RRC message, a MAC-CE message, or both. In some examples, the location of the one or more noise spurs is indicated via an indication of a percentage of an SCS and an anchor within the set of resources, an indication of one or more subcarrier indexes, or both. In some examples, the first wireless device includes a UE and the second wireless device includes a base station. In some examples, the first wireless device includes the base station and the second wireless device includes the UE.

Figure 7:
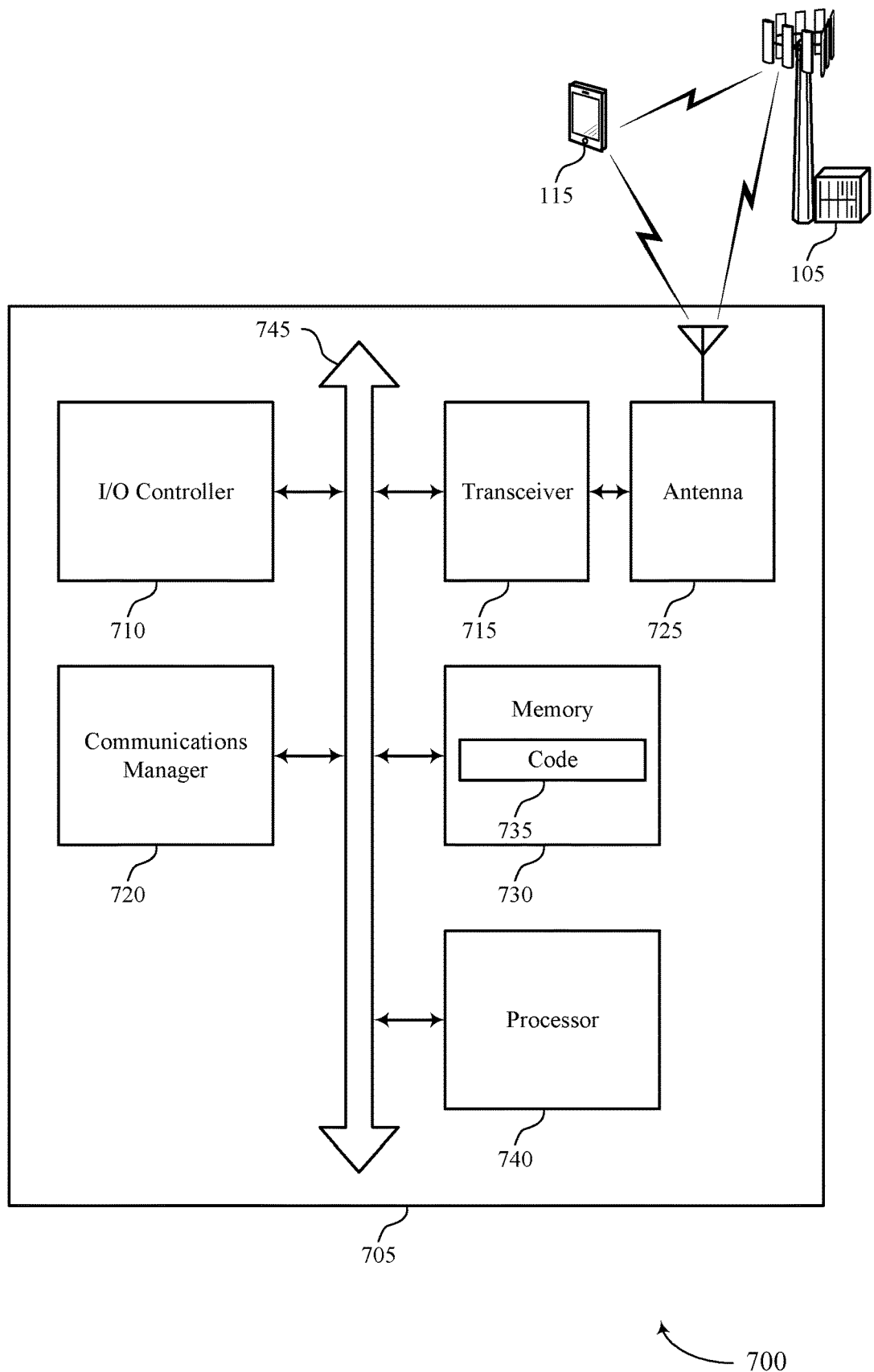
FIG. 7 shows a diagram of a system including a device that supports techniques for signaling transmitter noise spurs in accordance with aspects of the present disclosure.

FIG. 7 shows a diagram of a system 700 including a device 705 that supports techniques for signaling transmitter noise spurs in accordance with aspects of the present disclosure. The device 705 may be an example of or include the components of a device 405 or a device 505, as described herein. In this regard, the device 705 may include an example of a Tx device, including a UE 115 or a base station 105. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for signaling transmitter noise spurs). For example, the device 705 or a component of the device 705 may include a processor 740 and memory 730 coupled with or to the processor 740, the processor 740 and memory 730 configured to perform various functions described herein.

The communications manager 720 may support wireless communication at a first wireless device in accordance with examples as disclosed herein. For example, the communications manager 720 may be configured as or otherwise support a means for transmitting, to a second wireless device, a control message indicating a location of one or more noise spurs associated with wireless communications performed by the first wireless device using a set of resources, where the location includes a frequency location of the one or more noise spurs in a frequency domain of the set of resources. The communications manager 720 may be configured as or otherwise support a means for generating a data message to be communicated from the first wireless device to the second wireless device using the set of resources associated with the one or more noise spurs based on transmitting the control message. The communications manager 720 may be configured as or otherwise support a means for transmitting the generated data message to the second wireless device using the set of resources associated with the one or more noise spurs.

By including or configuring the communications manager 720 in accordance with examples as described herein, the device 705 may support techniques that enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system, which may reduce noise and improve a reliability of wireless communications within the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for signaling transmitter noise spurs as described herein, or the processor 740 and the memory 730 may be otherwise configured to perform or support such operations.

Figure 8:
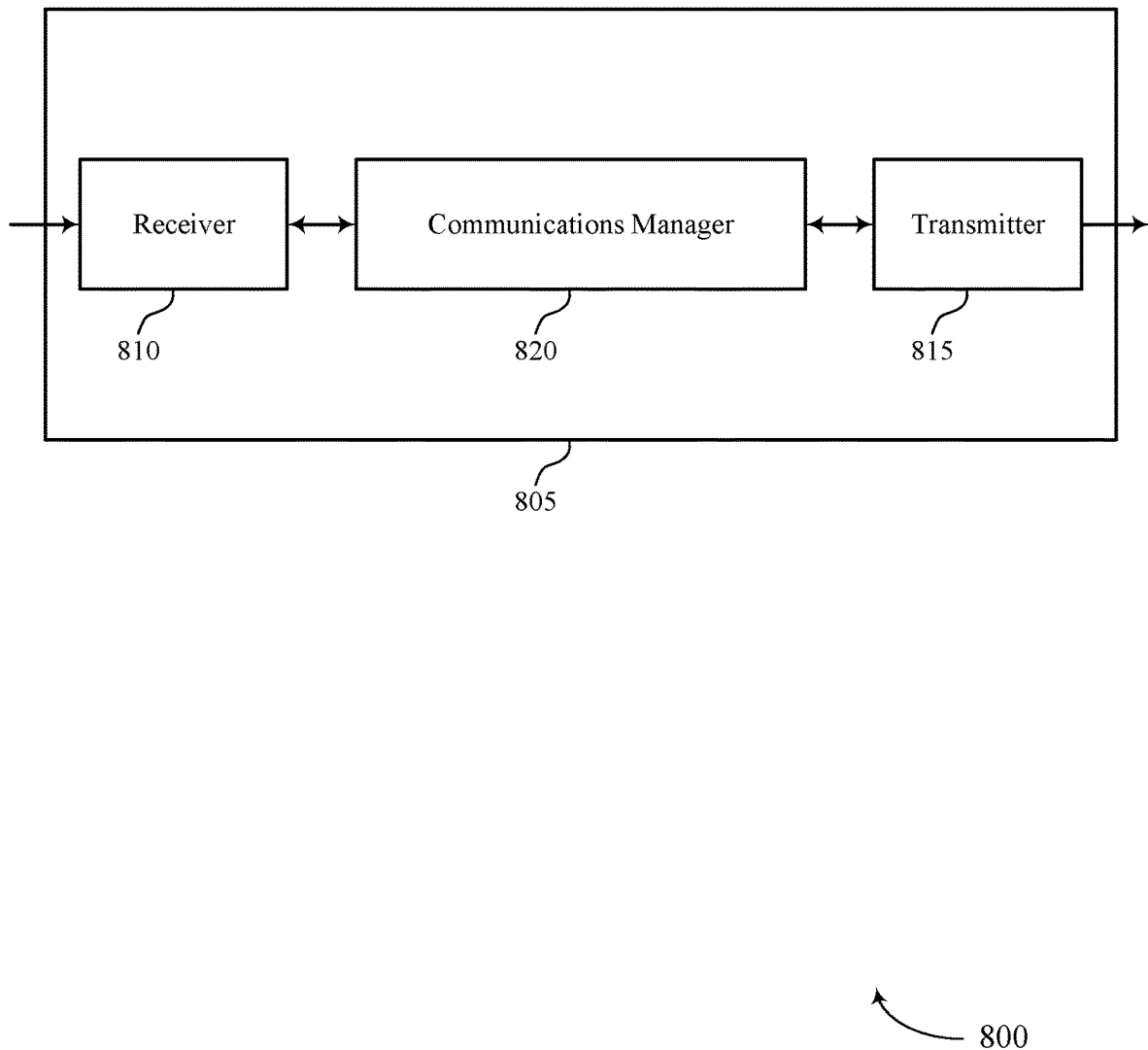
FIGS. 8 and 9 show block diagrams of devices that support techniques for signaling transmitter noise spurs in accordance with aspects of the present disclosure.

FIG. 8 shows a block diagram 800 of a device 805 that supports techniques for signaling transmitter noise spurs in accordance with aspects of the present disclosure. The device 805 may be an example of aspects of an Rx device (e.g., UE 115, base station 105) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for signaling transmitter noise spurs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for signaling transmitter noise spurs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for signaling transmitter noise spurs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a second wireless device in accordance with examples as disclosed herein. For example, the communications manager 820 may be configured as or otherwise support a means for receiving, from a first wireless device, a control message indicating a location of one or more noise spurs associated with wireless communications performed by the first wireless device using a set of resources, where the location includes a frequency location of the one or more noise spurs in a frequency domain of the set of resources. The communications manager 820 may be configured as or otherwise support a means for receiving, from the first wireless device and based on receiving the control message, a data message using the set of resources associated with the one or more noise spurs. The communications manager 820 may be configured as or otherwise support a means for performing one or more noise spur mitigation procedures for the data message based on the location of the one or more noise spurs.

By including or configuring the communications manager 820 in accordance with examples as described herein, the device 805 (e.g., a processor controlling or otherwise coupled to the receiver 810, the transmitter 815, the communications manager 820, or a combination thereof) may support techniques that enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system, which may reduce noise and improve a reliability of wireless communications within the wireless communications system.

Figure 9:
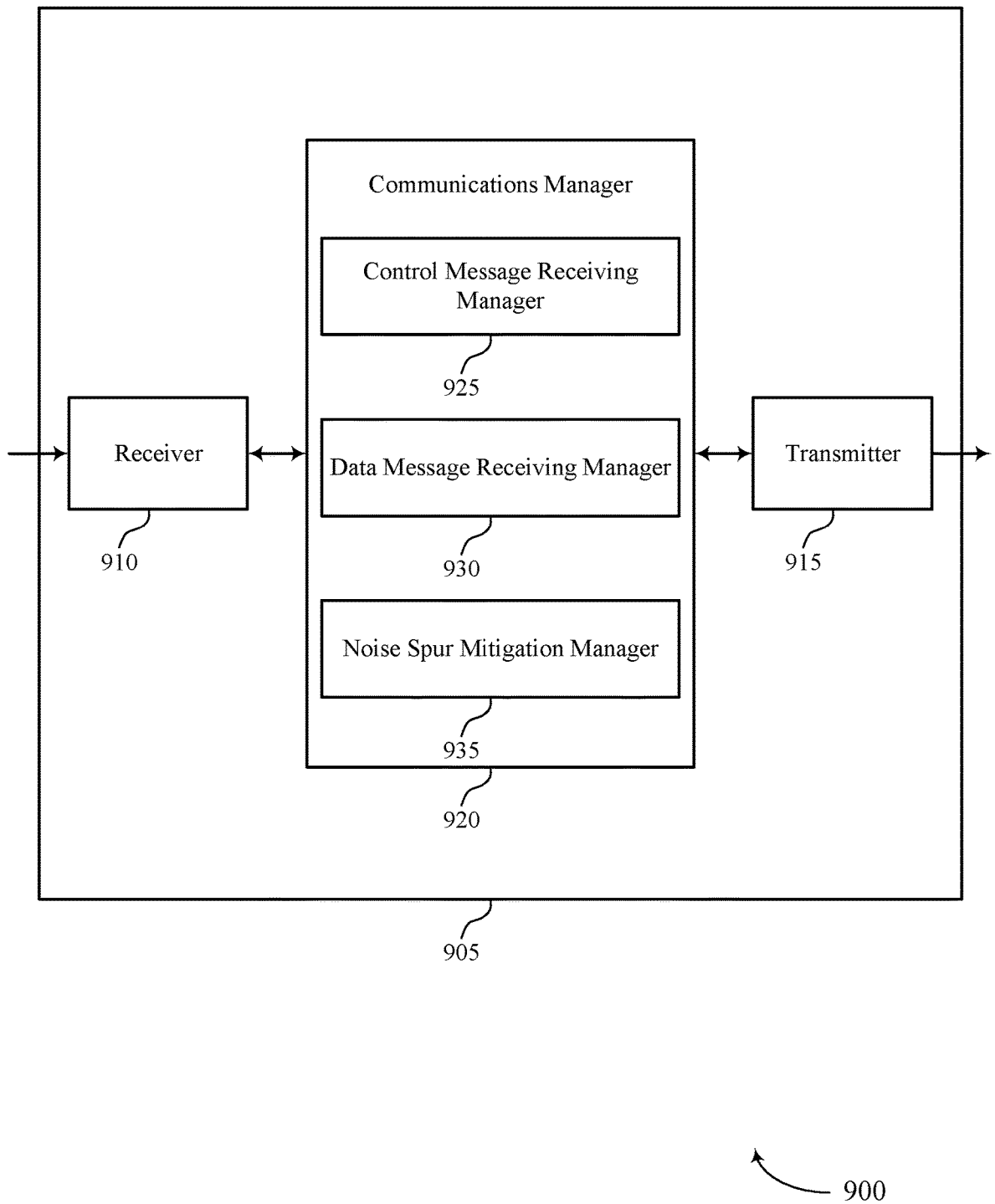

FIG. 9 shows a block diagram 900 of a device 905 that supports techniques for signaling transmitter noise spurs in accordance with aspects of the present disclosure. The device 905 may be an example of aspects of a device 805 (e.g., base station 105, UE 115) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for signaling transmitter noise spurs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for signaling transmitter noise spurs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for signaling transmitter noise spurs as described herein. For example, the communications manager 920 may include a control message receiving manager 925, a data message receiving manager 930, a noise spur mitigation manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second wireless device in accordance with examples as disclosed herein. The control message receiving manager 925 may be configured as or otherwise support a means for receiving, from a first wireless device, a control message indicating a location of one or more noise spurs associated with wireless communications performed by the first wireless device using a set of resources, where the location includes a frequency location of the one or more noise spurs in a frequency domain of the set of resources. The data message receiving manager 930 may be configured as or otherwise support a means for receiving, from the first wireless device and based on receiving the control message, a data message using the set of resources associated with the one or more noise spurs. The noise spur mitigation manager 935 may be configured as or otherwise support a means for performing one or more noise spur mitigation procedures for the data message based on the location of the one or more noise spurs.

Figure 10:
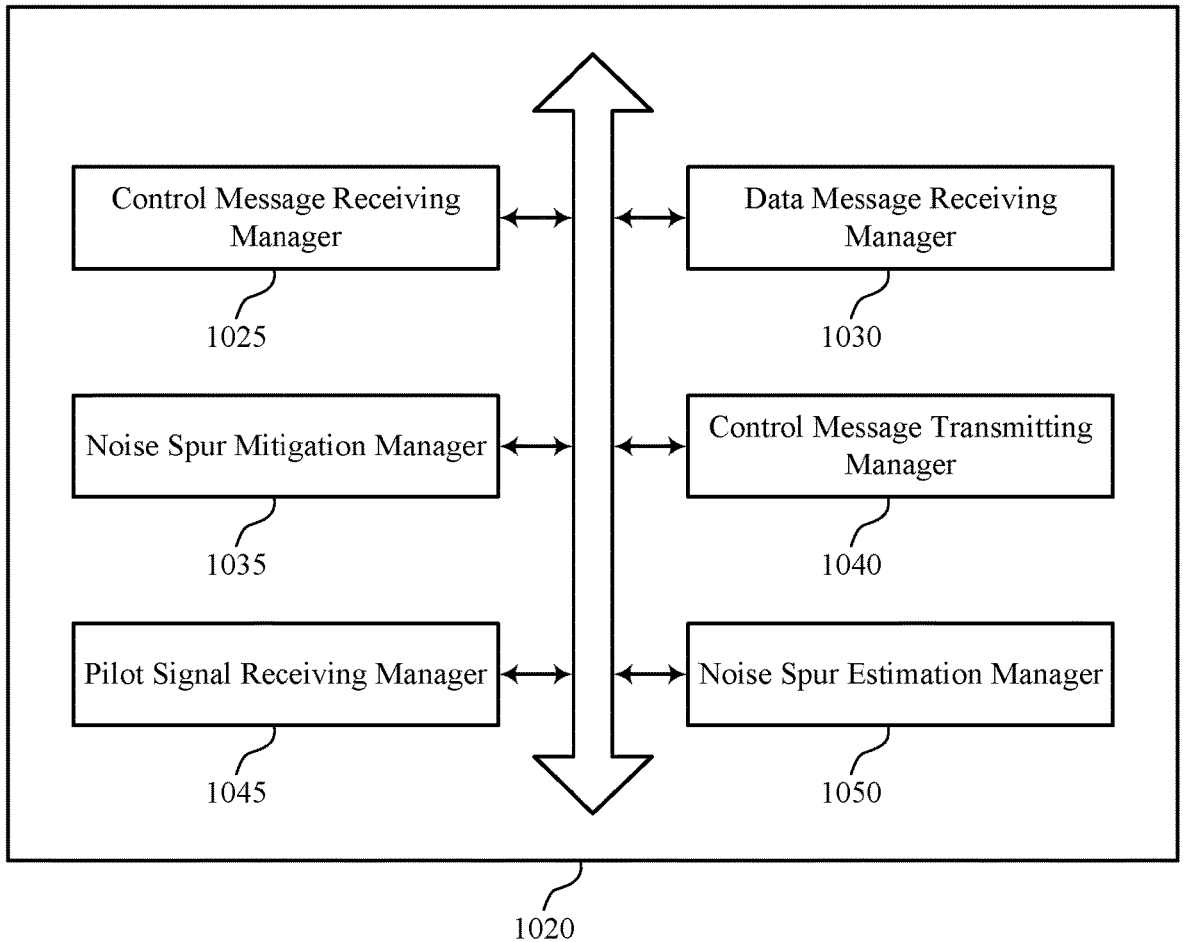
FIG. 10 shows a block diagram of a communications manager that supports techniques for signaling transmitter noise spurs in accordance with aspects of the present disclosure.

FIG. 10 shows a block diagram 1000 of a communications manager 1020 that supports techniques for signaling transmitter noise spurs in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for signaling transmitter noise spurs as described herein. For example, the communications manager 1020 may include a control message receiving manager 1025, a data message receiving manager 1030, a noise spur mitigation manager 1035, a control message transmitting manager 1040, a pilot signal receiving manager 1045, a noise spur estimation manager 1050, or any combination thereof. Each of these components may communicate, directly or indirectly, with one another (e.g., via one or more buses).

The communications manager 1020 may support wireless communication at a second wireless device in accordance with examples as disclosed herein. The control message receiving manager 1025 may be configured as or otherwise support a means for receiving, from a first wireless device, a control message indicating a location of one or more noise spurs associated with wireless communications performed by the first wireless device using a set of resources, where the location includes a frequency location of the one or more noise spurs in a frequency domain of the set of resources. The data message receiving manager 1030 may be configured as or otherwise support a means for receiving, from the first wireless device and based on receiving the control message, a data message using the set of resources associated with the one or more noise spurs. The noise spur mitigation manager 1035 may be configured as or otherwise support a means for performing one or more noise spur mitigation procedures for the data message based on the location of the one or more noise spurs.

In some examples, the control message receiving manager 1025 may be configured as or otherwise support a means for receiving, via the control message, an indication of a spur location configuration associated with a first beam, the spur location configuration including the location of the one or more noise spurs associated with wireless communications performed by the first wireless device using the first beam and the set of resources, where the data message is received via the first beam.

In some examples, the control message receiving manager 1025 may be configured as or otherwise support a means for receiving, via the control message, a second control message, or both, an indication of a second beam associated with the spur location configuration, the spur location configuration including the location of the one or more noise spurs associated with wireless communications performed by the first wireless device using the second beam and the set of resources. In some examples, the data message receiving manager 1030 may be configured as or otherwise support a means for receiving a second data message from the first wireless device using the second beam and the set of resources in response to receiving the control message, the second control message, or both.

In some examples, the control message receiving manager 1025 may be configured as or otherwise support a means for receiving, via the control message, a second control message, or both, an indication of a second spur location configuration associated with a second beam, the second spur location configuration including a second location of one or more additional noise spurs associated with wireless communications performed by the first wireless device using the second beam and the set of resources. In some examples, the data message receiving manager 1030 may be configured as or otherwise support a means for receiving a second data message from the first wireless device using the second beam and the set of resources in response to receiving the control message, the second control message, or both. In some examples, the indication of the spur location configuration includes a QCL type indicator associated with noise spurs.

In some examples, the control message transmitting manager 1040 may be configured as or otherwise support a means for transmitting, to the first wireless device and based on receiving the control message, a second control message indicating the one or more noise spur mitigation procedures performable by the second wireless device, where receiving the data message is based on the one or more noise spur mitigation procedures.

In some examples, the data message includes a portion of a communication transmitted by the first wireless device, and the control message receiving manager 1025 may be configured as or otherwise support a means for receiving, based on the indication of the one or more noise spur mitigation procedures, an indication of a time interval between a start of the communication and a start of the data message within the communication, where receiving the data message is based on the time interval.

In some examples, the pilot signal receiving manager 1045 may be configured as or otherwise support a means for receiving a set of pilot signals within the time interval using the set of resources associated with the one or more noise spurs. In some examples, the noise spur estimation manager 1050 may be configured as or otherwise support a means for estimating the one or more noise spurs based on receiving the set of pilot signals, where performing the one or more noise spur mitigation procedures is based on estimating the one or more noise spurs.

In some examples, the one or more noise spur mitigation procedures include an active mitigation procedure in which the second wireless device attempts to remove or filter noise spurs from received communications, a passive mitigation procedure in which the second wireless device ignores tones associated with noise spurs within received communications, or both, the active mitigation procedure including a time-domain mitigation procedure, a frequency-domain mitigation procedure, or both, and the passive mitigation procedure including a nulling procedure.

In some examples, the one or more noise spur mitigation procedures include a time-domain mitigation procedure associated with a notch filter, and the control message receiving manager 1025 may be configured as or otherwise support a means for receiving, from the first wireless device and in response to the indication of the one or more noise spur mitigation procedures, an indication of one or more filtering coefficients associated with the notch filter, where the one or more noise spur mitigation procedures are performed in accordance with the one or more filtering coefficients.

In some examples, the data message includes a portion of a communication transmitted by the first wireless device, and the control message transmitting manager 1040 may be configured as or otherwise support a means for transmitting, to the first wireless device and based on receiving the control message, a request for a time interval between a start of the communication and a start of the data message within the communication, where receiving the data message is based on the request, the time interval, or both.

In some examples, the pilot signal receiving manager 1045 may be configured as or otherwise support a means for receiving one or more pilot signals within the communication for at least the time interval. In some examples, the noise spur estimation manager 1050 may be configured as or otherwise support a means for estimating the one or more noise spurs based on receiving the one or more pilot signals, where the one or more noise spur mitigation procedures are performed based on estimating the one or more noise spurs.

In some examples, the set of resources includes a first component carrier, and the control message receiving manager 1025 may be configured as or otherwise support a means for receiving, via the control message, an additional control message, or both, an indication of a second location of one or more additional noise spurs associated with wireless communications performed by the first wireless device using a second component carrier, where the second location includes a second frequency location of the one or more additional noise spurs in a frequency domain of the second component carrier. In some examples, the first wireless device includes a UE and the second wireless device includes a base station. In some examples, the first wireless device includes the base station and the second wireless device includes the UE.

In some examples, the control message transmitting manager 1040 may be configured as or otherwise support a means for transmitting, to a third wireless device and based on receiving the control message, a second control message indicating the location of the one or more noise spurs.

Figure 11:
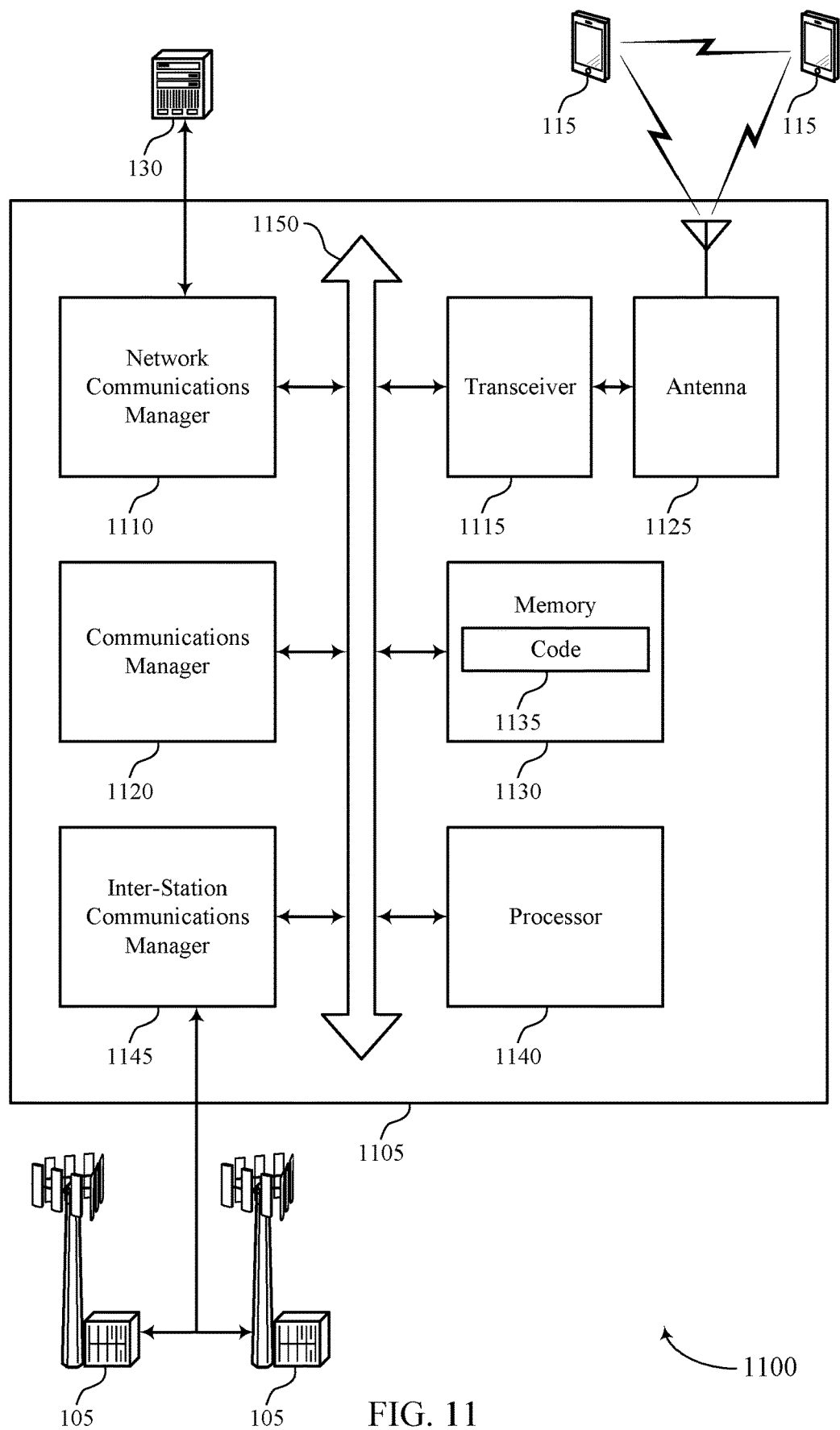
FIG. 11 shows a diagram of a system including a device that supports techniques for signaling transmitter noise spurs in accordance with aspects of the present disclosure.

FIG. 11 shows a diagram of a system 1100 including a device 1105 that supports techniques for signaling transmitter noise spurs in accordance with aspects of the present disclosure. The device 1105 may be an example of or include the components of a device 805 or a device 905, as described herein. In this regard, the device 1105 may include an example of an Rx device such as a base station 105 or a UE 115. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for signaling transmitter noise spurs). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a second wireless device in accordance with examples as disclosed herein. For example, the communications manager 1120 may be configured as or otherwise support a means for receiving, from a first wireless device, a control message indicating a location of one or more noise spurs associated with wireless communications performed by the first wireless device using a set of resources, where the location includes a frequency location of the one or more noise spurs in a frequency domain of the set of resources. The communications manager 1120 may be configured as or otherwise support a means for receiving, from the first wireless device and based on receiving the control message, a data message using the set of resources associated with the one or more noise spurs. The communications manager 1120 may be configured as or otherwise support a means for performing one or more noise spur mitigation procedures for the data message based on the location of the one or more noise spurs.

By including or configuring the communications manager 1120 in accordance with examples as described herein, the device 1105 may support techniques that enable Tx devices to indicate frequency locations of noise spurs within wireless communications transmitted by the Tx device, which may enable Rx devices to more efficiently and effectively identify and address (e.g., filter out, ignore) received noise spurs. As such, techniques described herein may mitigate parasitic effects of noise spurs within the wireless communications system, which may reduce noise and improve a reliability of wireless communications within the wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for signaling transmitter noise spurs as described herein, or the processor 1140 and the memory 1130 may be otherwise configured to perform or support such operations.

Figure 12:
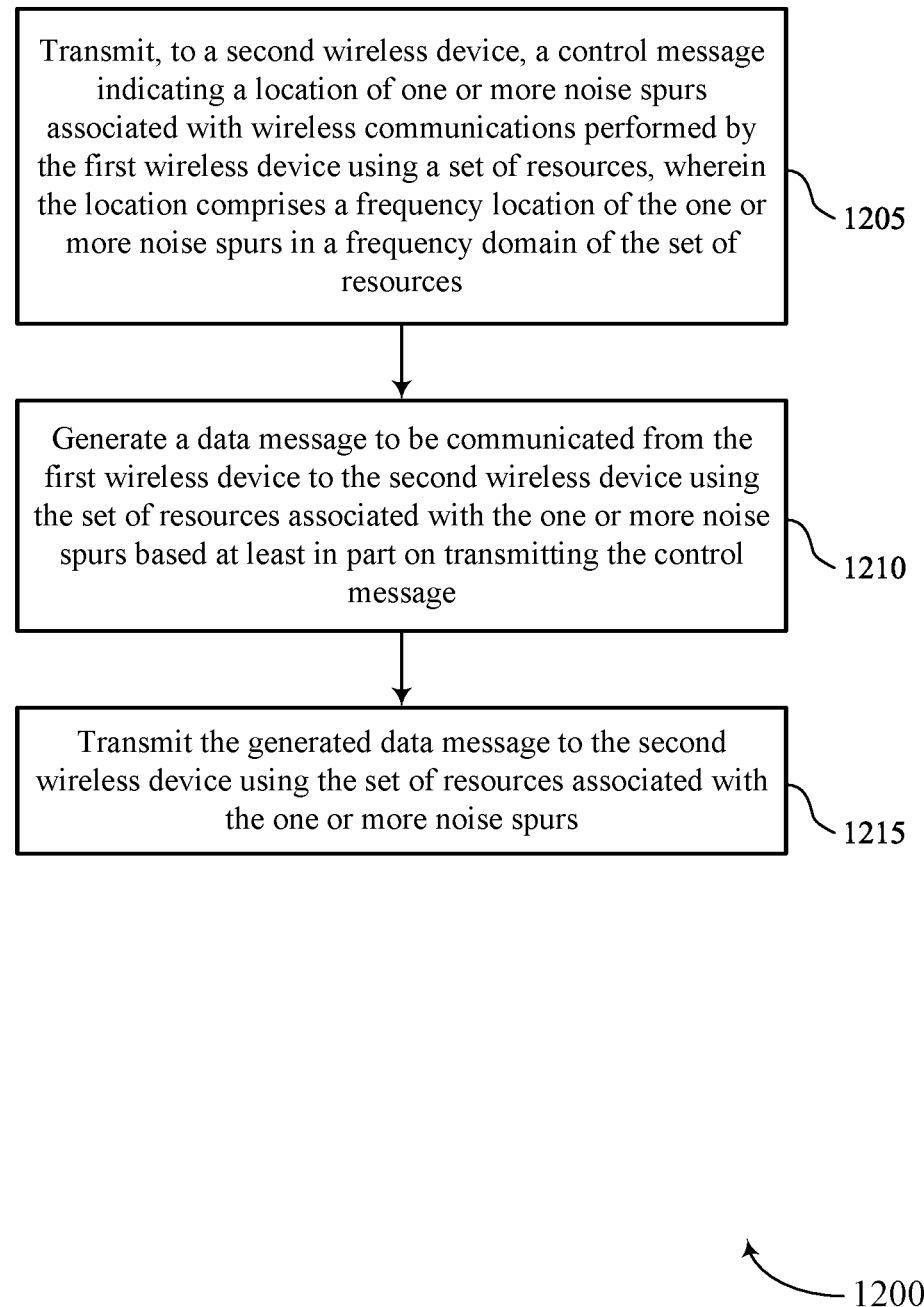
FIGS. 12 through 15 show flowcharts illustrating methods that support techniques for signaling transmitter noise spurs in accordance with aspects of the present disclosure.

FIG. 12 shows a flowchart illustrating a method 1200 that supports techniques for signaling transmitter noise spurs in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a second wireless device, a control message indicating a location of one or more noise spurs associated with wireless communications performed by the first wireless device using a set of resources, where the location includes a frequency location of the one or more noise spurs in a frequency domain of the set of resources. The operations of 1205 may be performed in accordance with examples as disclosed herein. In some examples, aspects of the operations of 1205 may be performed by a control message transmitting manager 625 as described with reference to FIG. 6.

At 1210, the method may include generating a data message to be communicated from the first wireless device to the second wireless device using the set of resources associated with the one or more noise spurs based on transmitting the control message. The operations of 1210 may be performed in accordance with examples as disclosed herein. In some examples, aspects of the operations of 1210 may be performed by a data message generating manager 630 as described with reference to FIG. 6.

At 1215, the method may include transmitting the generated data message to the second wireless device using the set of resources associated with the one or more noise spurs. The operations of 1215 may be performed in accordance with examples as disclosed herein. In some examples, aspects of the operations of 1215 may be performed by a data message transmitting manager 635 as described with reference to FIG. 6.

Figure 13:
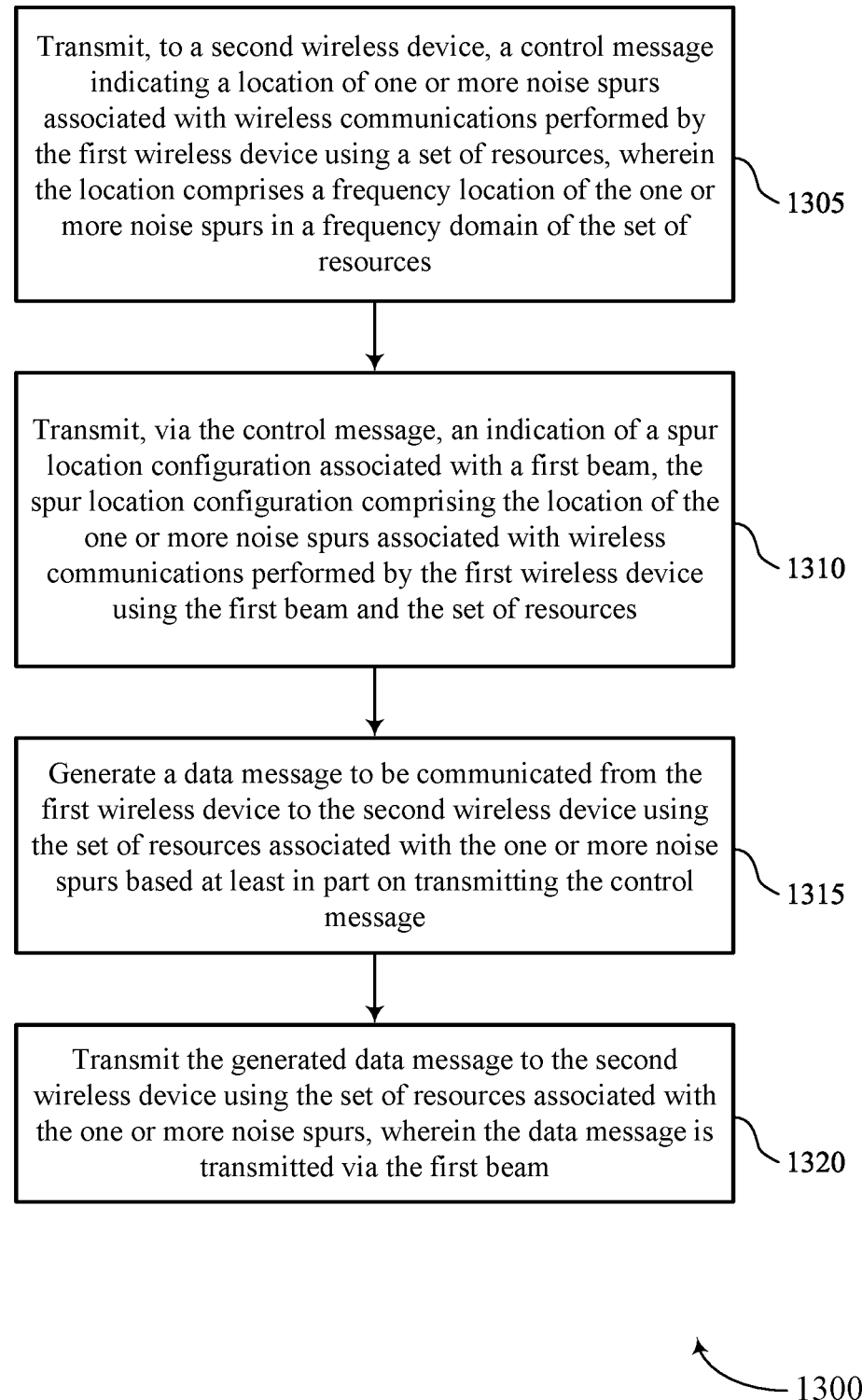

FIG. 13 shows a flowchart illustrating a method 1300 that supports techniques for signaling transmitter noise spurs in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a second wireless device, a control message indicating a location of one or more noise spurs associated with wireless communications performed by the first wireless device using a set of resources, where the location includes a frequency location of the one or more noise spurs in a frequency domain of the set of resources. The operations of 1305 may be performed in accordance with examples as disclosed herein. In some examples, aspects of the operations of 1305 may be performed by a control message transmitting manager 625 as described with reference to FIG. 6.

At 1310, the method may include transmitting, via the control message, an indication of a spur location configuration associated with a first beam, the spur location configuration including the location of the one or more noise spurs associated with wireless communications performed by the first wireless device using the first beam and the set of resources. The operations of 1310 may be performed in accordance with examples as disclosed herein. In some examples, aspects of the operations of 1310 may be performed by a control message transmitting manager 625 as described with reference to FIG. 6.

At 1315, the method may include generating a data message to be communicated from the first wireless device to the second wireless device using the set of resources associated with the one or more noise spurs based on transmitting the control message. The operations of 1315 may be performed in accordance with examples as disclosed herein. In some examples, aspects of the operations of 1315 may be performed by a data message generating manager 630 as described with reference to FIG. 6.

At 1320, the method may include transmitting the generated data message to the second wireless device using the set of resources associated with the one or more noise spurs, where the data message is transmitted via the first beam. The operations of 1320 may be performed in accordance with examples as disclosed herein. In some examples, aspects of the operations of 1320 may be performed by a data message transmitting manager 635 as described with reference to FIG. 6.

Figure 14:
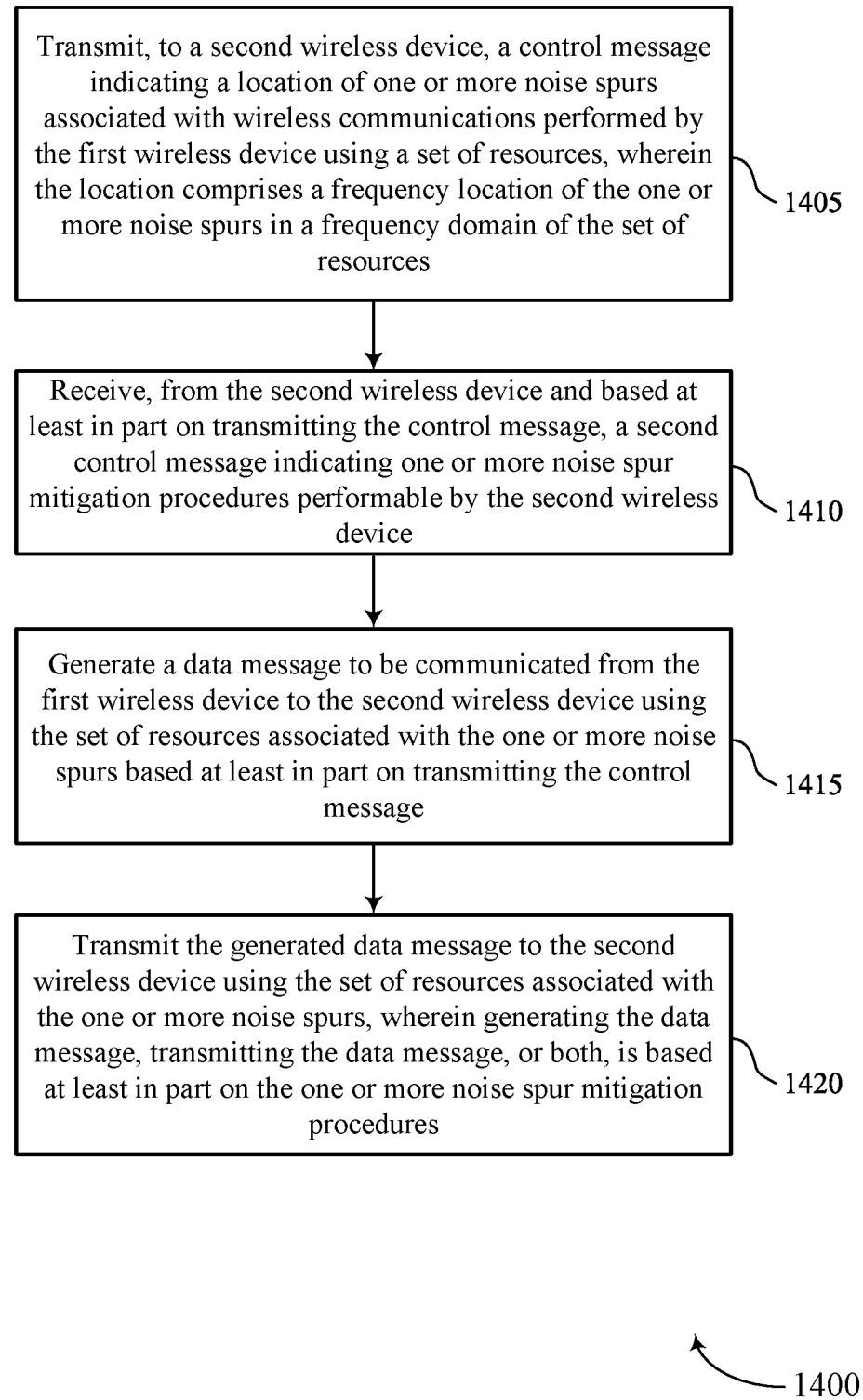

FIG. 14 shows a flowchart illustrating a method 1400 that supports techniques for signaling transmitter noise spurs in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to a second wireless device, a control message indicating a location of one or more noise spurs associated with wireless communications performed by the first wireless device using a set of resources, where the location includes a frequency location of the one or more noise spurs in a frequency domain of the set of resources. The operations of 1405 may be performed in accordance with examples as disclosed herein. In some examples, aspects of the operations of 1405 may be performed by a control message transmitting manager 625 as described with reference to FIG. 6.

At 1410, the method may include receiving, from the second wireless device and based on transmitting the control message, a second control message indicating one or more noise spur mitigation procedures performable by the second wireless device. The operations of 1410 may be performed in accordance with examples as disclosed herein. In some examples, aspects of the operations of 1410 may be performed by a control message receiving manager 640 as described with reference to FIG. 6.

At 1415, the method may include generating a data message to be communicated from the first wireless device to the second wireless device using the set of resources associated with the one or more noise spurs based on transmitting the control message. The operations of 1415 may be performed in accordance with examples as disclosed herein. In some examples, aspects of the operations of 1415 may be performed by a data message generating manager 630 as described with reference to FIG. 6.

At 1420, the method may include transmitting the generated data message to the second wireless device using the set of resources associated with the one or more noise spurs, where generating the data message, transmitting the data message, or both, is based on the one or more noise spur mitigation procedures. The operations of 1420 may be performed in accordance with examples as disclosed herein. In some examples, aspects of the operations of 1420 may be performed by a data message transmitting manager 635 as described with reference to FIG. 6.

Figure 15:
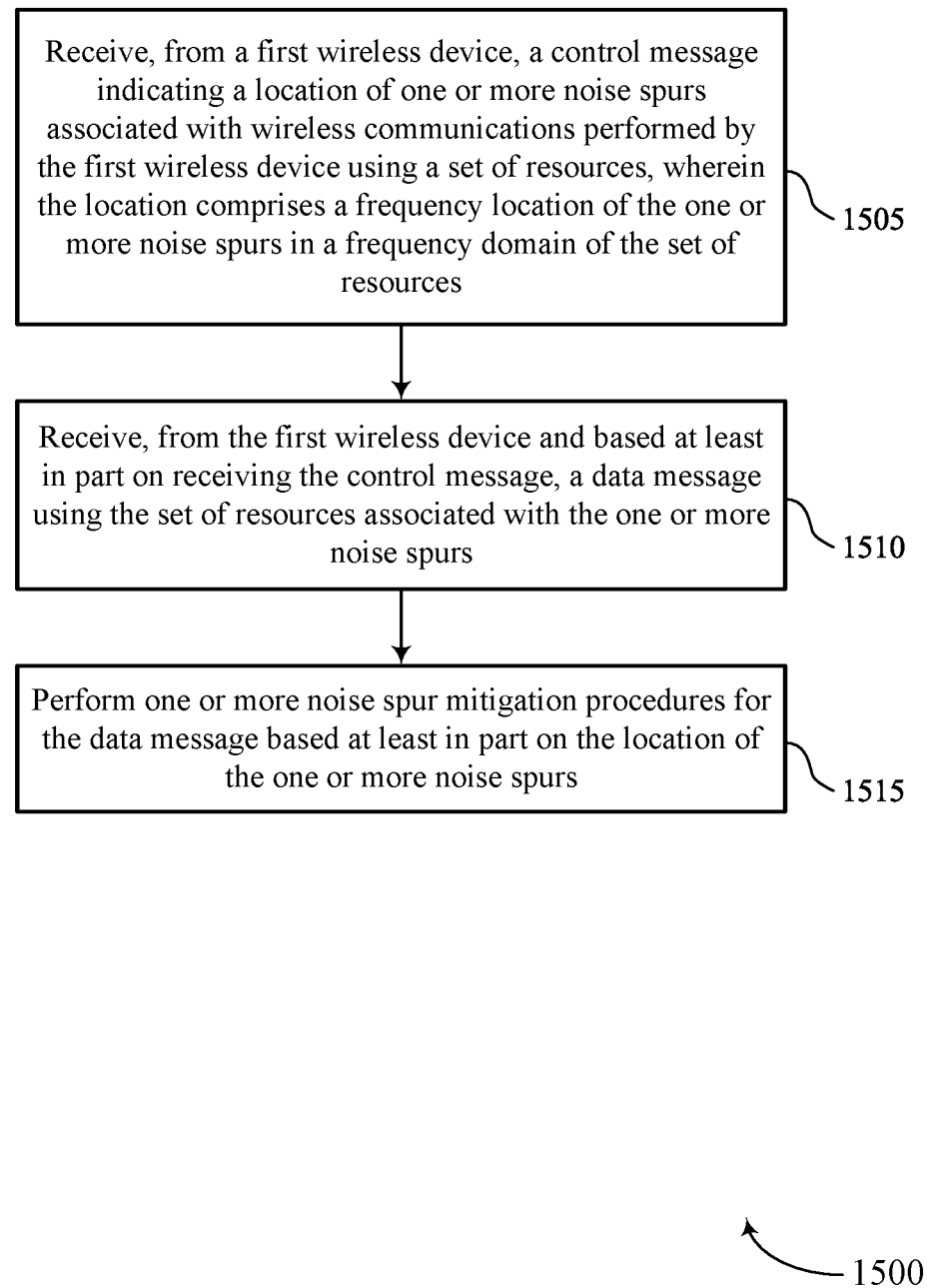

FIG. 15 shows a flowchart illustrating a method 1500 that supports techniques for signaling transmitter noise spurs in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a first wireless device, a control message indicating a location of one or more noise spurs associated with wireless communications performed by the first wireless device using a set of resources, where the location includes a frequency location of the one or more noise spurs in a frequency domain of the set of resources. The operations of 1505 may be performed in accordance with examples as disclosed herein. In some examples, aspects of the operations of 1505 may be performed by a control message receiving manager 1025 as described with reference to FIG. 10.

At 1510, the method may include receiving, from the first wireless device and based on receiving the control message, a data message using the set of resources associated with the one or more noise spurs. The operations of 1510 may be performed in accordance with examples as disclosed herein. In some examples, aspects of the operations of 1510 may be performed by a data message receiving manager 1030 as described with reference to FIG. 10.

At 1515, the method may include performing one or more noise spur mitigation procedures for the data message based on the location of the one or more noise spurs. The operations of 1515 may be performed in accordance with examples as disclosed herein. In some examples, aspects of the operations of 1515 may be performed by a noise spur mitigation manager 1035 as described with reference to FIG. 10.

The following provides an overview of aspects of the present disclosure:

Aspect 1: A method for wireless communication at a first wireless device, comprising: transmitting, to a second wireless device, a control message indicating a location of one or more noise spurs associated with wireless communications performed by the first wireless device using a set of resources, wherein the location comprises a frequency location of the one or more noise spurs in a frequency domain of the set of resources; generating a data message to be communicated from the first wireless device to the second wireless device using the set of resources associated with the one or more noise spurs based at least in part on transmitting the control message; and transmitting the generated data message to the second wireless device using the set of resources associated with the one or more noise spurs.

Aspect 2: The method of aspect 1, further comprising: transmitting, via the control message, an indication of a spur location configuration associated with a first beam, the spur location configuration comprising the location of the one or more noise spurs associated with wireless communications performed by the first wireless device using the first beam and the set of resources, wherein the data message is transmitted via the first beam.

Aspect 3: The method of aspect 2, further comprising: transmitting, via the control message, a second control message, or both, an indication of a second beam associated with the spur location configuration, the spur location configuration comprising the location of the one or more noise spurs associated with wireless communications performed by the first wireless device using the second beam and the set of resources; and transmitting a second data message to the second wireless device using the second beam and the set of resources in response to transmitting the control message, the second control message, or both.

Aspect 4: The method of any of aspects 2 through 3, further comprising: transmitting, via the control message, a second control message, or both, an indication of a second spur location configuration associated with a second beam, the second spur location configuration comprising a second location of one or more additional noise spurs associated with wireless communications performed by the first wireless device using the second beam and the set of resources; and transmitting a second data message to the second wireless device using the second beam and the set of resources in response to transmitting the control message, the second control message, or both.

Aspect 5: The method of any of aspects 2 through 4, wherein the indication of the spur location configuration comprises a QCL type indicator associated with noise spurs.

Aspect 6: The method of any of aspects 1 through 5, further comprising: receiving, from the second wireless device and based at least in part on transmitting the control message, a second control message indicating one or more noise spur mitigation procedures performable by the second wireless device, wherein generating the data message, transmitting the data message, or both, is based at least in part on the one or more noise spur mitigation procedures.

Aspect 7: The method of aspect 6, wherein generating the data message comprises: generating the data message, based at least in part on the one or more noise spur mitigation procedures, such that a pilot signal associated with the data message, data within the data message, or both, is transmitted at a second frequency location in the frequency domain of the set of resources that is different from the frequency location of the one or more noise spurs.

Aspect 8: The method of any of aspects 6 through 7, wherein the data message comprises a portion of a communication transmitted by the first wireless device, the method further comprising: transmitting, based at least in part on the one or more noise spur mitigation procedures, an indication of a time interval between a start of the communication and a start of the data message within the communication, wherein generating the data message, transmitting the data message, or both, are based at least in part on the time interval.

Aspect 9: The method of aspect 8, further comprising: transmitting a set of pilot signals including the one or more noise spurs within the time interval using the set of resources associated with the one or more noise spurs.

Aspect 10: The method of any of aspects 8 through 9, wherein the indication of the time interval comprises an indication of a portion of a symbol length between the start of the communication and the start of the data message within the communication.

Aspect 11: The method of any of aspects 6 through 10, wherein the one or more noise spur mitigation procedures comprise an active mitigation procedure in which the second wireless device attempts to remove or filter noise spurs from received communications, a passive mitigation procedure in which the second wireless device ignores tones associated with noise spurs within received communications, or both, the active mitigation procedure comprising a TD mitigation procedure, an FD mitigation procedure, or both, and the passive mitigation procedure comprising a nulling procedure.

Aspect 12: The method of aspect 11, further comprising: identifying whether the one or more noise spur mitigation procedures performable by the second wireless device include an active mitigation procedure, a passive mitigation procedure, or both, wherein generating the data message, transmitting the data message, or both, is based at least in part on the identifying.

Aspect 13: The method of any of aspects 6 through 12, wherein the noise spur mitigation procedure comprises a TD mitigation procedure associated with a notch filter, the method further comprising: transmitting, to the second wireless device and in response to the noise spur mitigation procedure, an indication of one or more filtering coefficients associated with the notch filter.

Aspect 14: The method of aspect 13, further comprising: identifying a stability of the one or more noise spurs associated with the set of resources; and determining the one or more filtering coefficients based at least in part on the stability.

Aspect 15: The method of any of aspects 1 through 14, wherein the data message comprises a portion of a communication transmitted by the first wireless device, the method further comprising: receiving, from the second wireless device and based at least in part on transmitting the control message, a request for a time interval between a start of the communication and a start of the data message within the communication, wherein generating the data message, transmitting the data message, or both, are based at least in part on the request, the time interval, or both.

Aspect 16: The method of aspect 15, wherein transmitting the data message comprises: transmitting one or more pilot signals including the one or more noise spurs within the communication for at least the time interval prior to transmitting the data message based at least in part on the request.

Aspect 17: The method of any of aspects 1 through 16, wherein the set of resources comprises a first component carrier, the method further comprising: transmitting, via the control message, an additional control message, or both, an indication of a second location of one or more additional noise spurs associated with wireless communications performed by the first wireless device using a second component carrier, wherein the second location comprises a second frequency location of the one or more additional noise spurs in a frequency domain of the second component carrier.

Aspect 18: The method of any of aspects 1 through 17, wherein the control message comprises an RRC message, a MAC-CE message, or both.

Aspect 19: The method of any of aspects 1 through 18, wherein the location of the one or more noise spurs is indicated via an indication of a percentage of an SCS and an anchor within the set of resources, an indication of one or more subcarrier indexes, or both.

Aspect 20: The method of any of aspects 1 through 19, wherein the first wireless device comprises a UE and the second wireless device comprises a base station, or the first wireless device comprises the base station and the second wireless device comprises the UE.

Aspect 21: A method for wireless communication at a second wireless device, comprising: receiving, from a first wireless device, a control message indicating a location of one or more noise spurs associated with wireless communications performed by the first wireless device using a set of resources, wherein the location comprises a frequency location of the one or more noise spurs in a frequency domain of the set of resources; receiving, from the first wireless device and based at least in part on receiving the control message, a data message using the set of resources associated with the one or more noise spurs; and performing one or more noise spur mitigation procedures for the data message based at least in part on the location of the one or more noise spurs.

Aspect 22: The method of aspect 21, further comprising: receiving, via the control message, an indication of a spur location configuration associated with a first beam, the spur location configuration comprising the location of the one or more noise spurs associated with wireless communications performed by the first wireless device using the first beam and the set of resources, wherein the data message is received via the first beam.

Aspect 23: The method of aspect 22, further comprising: receiving, via the control message, a second control message, or both, an indication of a second beam associated with the spur location configuration, the spur location configuration comprising the location of the one or more noise spurs associated with wireless communications performed by the first wireless device using the second beam and the set of resources; and receiving a second data message from the first wireless device using the second beam and the set of resources in response to receiving the control message, the second control message, or both.

Aspect 24: The method of any of aspects 22 through 23, further comprising: receiving, via the control message, a second control message, or both, an indication of a second spur location configuration associated with a second beam, the second spur location configuration comprising a second location of one or more additional noise spurs associated with wireless communications performed by the first wireless device using the second beam and the set of resources; and receiving a second data message from the first wireless device using the second beam and the set of resources in response to receiving the control message, the second control message, or both.

Aspect 25: The method of any of aspects 22 through 24, wherein the indication of the spur location configuration comprises a QCL type indicator associated with noise spurs.

Aspect 26: The method of any of aspects 21 through 25, further comprising: transmitting, to the first wireless device and based at least in part on receiving the control message, a second control message indicating the one or more noise spur mitigation procedures performable by the second wireless device, wherein receiving the data message is based at least in part on the one or more noise spur mitigation procedures.

Aspect 27: The method of aspect 26, wherein the data message comprises a portion of a communication transmitted by the first wireless device, the method further comprising: receiving, based at least in part on the indication of the one or more noise spur mitigation procedures, an indication of a time interval between a start of the communication and a start of the data message within the communication, wherein receiving the data message is based at least in part on the time interval.

Aspect 28: The method of aspect 27, further comprising: receiving a set of pilot signals including the one or more noise spurs within the time interval using the set of resources associated with the one or more noise spurs; and estimating the one or more noise spurs based at least in part on receiving the set of pilot signals, wherein performing the one or more noise spur mitigation procedures is based at least in part on estimating the one or more noise spurs.

Aspect 29: The method of any of aspects 26 through 28, wherein the one or more noise spur mitigation procedures comprise an active mitigation procedure in which the second wireless device attempts to remove or filter noise spurs from received communications, a passive mitigation procedure in which the second wireless device ignores tones associated with noise spurs within received communications, or both, the active mitigation procedure comprising a TD mitigation procedure, an FD mitigation procedure, or both, and the passive mitigation procedure comprising a nulling procedure.

Aspect 30: The method of any of aspects 26 through 29, wherein the one or more noise spur mitigation procedures comprise a TD mitigation procedure associated with a notch filter, the method further comprising: receiving, from the first wireless device and in response to the indication of the one or more noise spur mitigation procedures, an indication of one or more filtering coefficients associated with the notch filter, wherein the one or more noise spur mitigation procedures are performed in accordance with the one or more filtering coefficients.

Aspect 31: The method of any of aspects 21 through 30, wherein the data message comprises a portion of a communication transmitted by the first wireless device, the method further comprising: transmitting, to the first wireless device and based at least in part on receiving the control message, a request for a time interval between a start of the communication and a start of the data message within the communication, wherein receiving the data message is based at least in part on the request, the time interval, or both.

Aspect 32: The method of aspect 31, further comprising: receiving one or more pilot signals including the one or more noise spurs within the communication for at least the time interval; estimating the one or more noise spurs based at least in part on receiving the one or more pilot signals, wherein the one or more noise spur mitigation procedures are performed based at least in part on estimating the one or more noise spurs Aspect 33: The method of any of aspects 21 through 32, wherein the set of resources comprises a first component carrier, the method further comprising: receiving, via the control message, an additional control message, or both, an indication of a second location of one or more additional noise spurs associated with wireless communications performed by the first wireless device using a second component carrier, wherein the second location comprises a second frequency location of the one or more additional noise spurs in a frequency domain of the second component carrier.

Aspect 34: The method of any of aspects 21 through 33, wherein the first wireless device comprises a UE and the second wireless device comprises a base station, or the first wireless device comprises the base station and the second wireless device comprises the UE.

Aspect 35: The method of any of aspects 21 through 34, further comprising: transmitting, to a third wireless device and based at least in part on receiving the control message, a second control message indicating the location of the one or more noise spurs.

Aspect 36: An apparatus for wireless communication at a first wireless device, comprising a processor; memory coupled with the processor; and instructions stored in the memory and executable by the processor to cause the apparatus to perform a method of any of aspects 1 through 20.

Aspect 37: An apparatus for wireless communication at a first wireless device, comprising at least one means for performing a method of any of aspects 1 through 20.

Aspect 38: A non-transitory computer-readable medium storing code for wireless communication at a first wireless device, the code comprising instructions executable by a processor to perform a method of any of aspects 1 through 20.

Aspect 39: An apparatus for wireless communication at a second wireless device, comprising a processor; memory coupled with the processor; and instructions stored in the memory and executable by the processor to cause the apparatus to perform a method of any of aspects 21 through 35.

Aspect 40: An apparatus for wireless communication at a second wireless device, comprising at least one means for performing a method of any of aspects 21 through 35.

Aspect 41: A non-transitory computer-readable medium storing code for wireless communication at a second wireless device, the code comprising instructions executable by a processor to perform a method of any of aspects 21 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
    transmitting, to a second wireless device, a control message indicating a location of one or more noise spurs associated with wireless communications performed by the first wireless device using a set of resources, wherein the location comprises a frequency location of the one or more noise spurs in a frequency domain of the set of resources;

generating a data message to be communicated from the first wireless device to the second wireless device using the set of resources associated with the one or more noise spurs based at least in part on transmitting the control message; and transmitting the generated data message to the second wireless device using the set of resources associated with the one or more noise spurs.

2. The method of claim 1, further comprising:

transmitting, via the control message, an indication of a spur location configuration associated with a first beam, the spur location configuration comprising the location of the one or more noise spurs associated with wireless communications performed by the first wireless device using the first beam and the set of resources, wherein the data message is transmitted via the first beam.

3. The method of claim 2, further comprising:

transmitting, via the control message, a second control message, or both, an indication of a second beam associated with the spur location configuration, the spur location configuration comprising the location of the one or more noise spurs associated with wireless communications performed by the first wireless device using the second beam and the set of resources; and transmitting a second data message to the second wireless device using the second beam and the set of resources in response to transmitting the control message, the second control message, or both.

4. The method of claim 2, further comprising:

transmitting, via the control message, a second control message, or both, an indication of a second spur location configuration associated with a second beam, the second spur location configuration comprising a second location of one or more additional noise spurs associated with wireless communications performed by the first wireless device using the second beam and the set of resources; and transmitting a second data message to the second wireless device using the second beam and the set of resources in response to transmitting the control message, the second control message, or both.

5. The method of claim 2, wherein the indication of the spur location configuration comprises a quasi co-location type indicator associated with noise spurs.

6. The method of claim 1, further comprising:

receiving, from the second wireless device and based at least in part on transmitting the control message, a second control message indicating one or more noise spur mitigation procedures performable by the second wireless device, wherein generating the data message, transmitting the data message, or both, is based at least in part on the one or more noise spur mitigation procedures.

7. The method of claim 6, wherein generating the data message comprises:

generating the data message, based at least in part on the one or more noise spur mitigation procedures, such that a pilot signal associated with the data message, data within the data message, or both, is transmitted at a second frequency location in the frequency domain of the set of resources that is different from the frequency location of the one or more noise spurs.

8. The method of claim 6, wherein the data message comprises a portion of a communication transmitted by the first wireless device, the method further comprising:

transmitting, based at least in part on the one or more noise spur mitigation procedures, an indication of a time interval between a start of the communication and a start of the data message within the communication, wherein generating the data message, transmitting the data message, or both, are based at least in part on the time interval.

9. The method of claim 8, further comprising:

transmitting a set of pilot signals including the one or more noise spurs within the time interval using the set of resources associated with the one or more noise spurs.

10. The method of claim 8, wherein the indication of the time interval comprises an indication of a portion of a symbol length between the start of the communication and the start of the data message within the communication.

11. The method of claim 6, wherein the one or more noise spur mitigation procedures comprise an active mitigation procedure in which the second wireless device attempts to remove or filter noise spurs from received communications, a passive mitigation procedure in which the second wireless device ignores tones associated with noise spurs within received communications, or both, the active mitigation procedure comprising a time-domain mitigation procedure, a frequency-domain mitigation procedure, or both, and the passive mitigation procedure comprising a nulling procedure.

12. The method of claim 11, further comprising:

identifying whether the one or more noise spur mitigation procedures performable by the second wireless device include the active mitigation procedure, the passive mitigation procedure, or both, wherein generating the data message, transmitting the data message, or both, is based at least in part on the identifying.

13. The method of claim 6, wherein at least one of the one or more noise spur mitigation procedures comprises a time-domain mitigation procedure associated with a notch filter, the method further comprising:

transmitting, to the second wireless device and in response to the at least one noise spur mitigation procedure, an indication of one or more filtering coefficients associated with the notch filter.

14. The method of claim 13, further comprising:

identifying a stability of the one or more noise spurs associated with the set of resources; and determining the one or more filtering coefficients based at least in part on the stability.

15. The method of claim 1, wherein the data message comprises a portion of a communication transmitted by the first wireless device, the method further comprising:

receiving, from the second wireless device and based at least in part on transmitting the control message, a request for a time interval between a start of the communication and a start of the data message within the communication, wherein generating the data message, transmitting the data message, or both, are based at least in part on the request, the time interval, or both.

16. The method of claim 15, wherein transmitting the data message comprises:

transmitting one or more pilot signals including the one or more noise spurs within the communication for at least the time interval prior to transmitting the data message based at least in part on the request.

17. The method of claim 1, wherein the set of resources comprises a first component carrier, the method further comprising:
transmitting, via the control message, an additional control message, or both, an indication of a second location of one or more additional noise spurs associated with wireless communications performed by the first wireless device using a second component carrier, wherein the second location comprises a second frequency location of the one or more additional noise spurs in a frequency domain of the second component carrier.

18. The method of claim 1, wherein the control message comprises a radio resource control message, a medium access control-control element message, or both.

19. The method of claim 1, wherein the location of the one or more noise spurs is indicated via an indication of a percentage of a subcarrier spacing and an anchor within the set of resources, an indication of one or more subcarrier indexes, or both.

20. The method of claim 1, wherein the first wireless device comprises a user equipment (UE) and the second wireless device comprises a base station, or wherein the first wireless device comprises the base station and the second wireless device comprises the UE.

21. A method for wireless communication at a second wireless device, comprising:
receiving, from a first wireless device, a control message indicating a location of one or more noise spurs associated with wireless communications performed by the first wireless device using a set of resources, wherein the location comprises a frequency location of the one or more noise spurs in a frequency domain of the set of resources;
receiving, from the first wireless device and based at least in part on receiving the control message, a data message using the set of resources associated with the one or more noise spurs; and
performing one or more noise spur mitigation procedures for the data message based at least in part on the location of the one or more noise spurs.

22. The method of claim 21, further comprising:
receiving, via the control message, an indication of a spur location configuration associated with a first beam, the spur location configuration comprising the location of the one or more noise spurs associated with wireless communications performed by the first wireless device using the first beam and the set of resources, wherein the data message is received via the first beam.

23. The method of claim 22, further comprising:
receiving, via the control message, a second control message, or both, an indication of a second beam associated with the spur location configuration, the spur location configuration comprising the location of the one or more noise spurs associated with wireless communications performed by the first wireless device using the second beam and the set of resources; and
receiving a second data message from the first wireless device using the second beam and the set of resources in response to receiving the control message, the second control message, or both.

24. The method of claim 22, further comprising:
receiving, via the control message, a second control message, or both, an indication of a second spur location configuration associated with a second beam, the second spur location configuration comprising a second location of one or more additional noise spurs associated with wireless communications performed by the first wireless device using the second beam and the set of resources; and
receiving a second data message from the first wireless device using the second beam and the set of resources in response to receiving the control message, the second control message, or both.

25. The method of claim 22, wherein the indication of the spur location configuration comprises a quasi co-location type indicator associated with noise spurs.

26. The method of claim 21, further comprising:
transmitting, to the first wireless device and based at least in part on receiving the control message, a second control message indicating the one or more noise spur mitigation procedures performable by the second wireless device, wherein receiving the data message is based at least in part on the one or more noise spur mitigation procedures.

27. The method of claim 26, wherein the data message comprises a portion of a communication transmitted by the first wireless device, the method further comprising:
receiving, based at least in part on the indication of the one or more noise spur mitigation procedures, an indication of a time interval between a start of the communication and a start of the data message within the communication, wherein receiving the data message is based at least in part on the time interval.

28. The method of claim 21, further comprising:
transmitting, to a third wireless device and based at least in part on receiving the control message, a second control message indicating the location of the one or more noise spurs.

29. An apparatus for wireless communication at a first wireless device, comprising:
a processor; and
a memory coupled with the processor, with instructions stored in the memory, the instructions being executable by the processor to cause the apparatus to:
transmit, to a second wireless device, a control message indicating a location of one or more noise spurs associated with wireless communications performed by the first wireless device using a set of resources, wherein the location comprises a frequency location of the one or more noise spurs in a frequency domain of the set of resources;
generate a data message to be communicated from the first wireless device to the second wireless device using the set of resources associated with the one or more noise spurs based at least in part on transmitting the control message; and
transmit the generated data message to the second wireless device using the set of resources associated with the one or more noise spurs.

30. An apparatus for wireless communication at a second wireless device, comprising:
a processor; and
a memory coupled with the processor, with instructions stored in the memory, the instructions being executable by the processor to cause the apparatus to:
receive, from a first wireless device, a control message indicating a location of one or more noise spurs associated with wireless communications performed by the first wireless device using a set of resources, wherein the location comprises a frequency location of the one or more noise spurs in a frequency domain of the set of resources;

receive, from the first wireless device and based at least in part on receiving the control message, a data message using the set of resources associated with the one or more noise spurs; and perform one or more noise spur mitigation procedures for the data message based at least in part on the location of the one or more noise spurs.

* * * * *